US010171792B2

(12) United States Patent
Liu et al.

(10) Patent No.: US 10,171,792 B2
(45) Date of Patent: Jan. 1, 2019

(54) DEVICE AND METHOD FOR THREE-DIMENSIONAL VIDEO COMMUNICATION

(71) Applicants: Yang Liu, Akron, OH (US); Christopher Mela, Akron, OH (US)

(72) Inventors: Yang Liu, Akron, OH (US); Christopher Mela, Akron, OH (US)

(73) Assignee: The University of Akron, Akron, OH (US)

( * ) Notice: Subject to any disclaimer, the term of this patent is extended or adjusted under 35 U.S.C. 154(b) by 0 days.

(21) Appl. No.: 15/504,073

(22) PCT Filed: Aug. 17, 2015

(86) PCT No.: PCT/US2015/045582
§ 371 (c)(1),
(2) Date: Feb. 15, 2017

(87) PCT Pub. No.: WO2016/025962
PCT Pub. Date: Feb. 18, 2016

(65) Prior Publication Data
US 2017/0295357 A1    Oct. 12, 2017

Related U.S. Application Data

(60) Provisional application No. 62/037,781, filed on Aug. 15, 2014.

(51) Int. Cl.
*H04N 7/14*    (2006.01)
*H04N 13/189*    (2018.01)
(Continued)

(52) U.S. Cl.
CPC ......... *H04N 13/189* (2018.05); *G06F 1/1626* (2013.01); *G06F 3/04815* (2013.01);
(Continued)

(58) Field of Classification Search
CPC ....................................................... H04N 7/14
See application file for complete search history.

(56) References Cited

U.S. PATENT DOCUMENTS

| 8,937,646 B1* | 1/2015 | Baldwin | H04N 13/0011 |
| | | | 348/42 |
| 2010/0309290 A1* | 12/2010 | Myers | H04N 7/141 |
| | | | 348/46 |

(Continued)

*Primary Examiner* — Olisa Anwah
(74) *Attorney, Agent, or Firm* — Renner, Kenner, Greive, Bobak, Taylor & Weber Co. LPA

(57) ABSTRACT

A three-dimensional (3D) communication device includes a 3D stereoscopic camera for capturing video and photos in 3D. The device also includes a 3D display, which enables the display of video and photos in 3D that have been captured by a local user's communication device or that have been received from a remote 3D communication device. The 3D communication device may be configured as a handheld standalone device or may alternatively be configured as a modular device, a case, or a dock that can be interfaced with a portable computing device, such as a smart phone, which lacks the capability to capture and view 3D video/photo content. As such, the 3D communication device enables 3D chat or communication between a local user and one or more remote users of the 3D communication device or any other computing device that is configured with suitable communication or chat software.

20 Claims, 22 Drawing Sheets

After Adjustment

(51) Int. Cl.
 H04N 21/81    (2011.01)
 H04M 1/725    (2006.01)
 G06F 1/16     (2006.01)
 G06F 3/0481   (2013.01)
 H04N 13/128   (2018.01)
 H04N 13/271   (2018.01)
 H04N 13/302   (2018.01)
 H04N 13/296   (2018.01)
 H04N 13/194   (2018.01)
 H04N 13/243   (2018.01)
 H04N 13/239   (2018.01)
 H04N 13/398   (2018.01)
 H04M 1/02     (2006.01)
 H04N 13/139   (2018.01)
 H04N 13/161   (2018.01)
 H04N 13/337   (2018.01)
 H04N 13/341   (2018.01)
 H04N 13/305   (2018.01)
 H04N 13/344   (2018.01)
 H04N 13/156   (2018.01)
 H04N 13/246   (2018.01)
 H04N 13/30    (2018.01)
 H04N 13/31    (2018.01)
 H04N 13/366   (2018.01)

(52) U.S. Cl.
 CPC ........ *H04M 1/72527* (2013.01); *H04N 7/142* (2013.01); *H04N 13/128* (2018.05); *H04N 13/194* (2018.05); *H04N 13/239* (2018.05); *H04N 13/243* (2018.05); *H04N 13/271* (2018.05); *H04N 13/296* (2018.05); *H04N 13/302* (2018.05); *H04N 13/398* (2018.05); *H04N 21/816* (2013.01); *H04M 1/0268* (2013.01); *H04M 2250/52* (2013.01); *H04N 13/139* (2018.05); *H04N 13/156* (2018.05); *H04N 13/161* (2018.05); *H04N 13/246* (2018.05); *H04N 13/30* (2018.05); *H04N 13/305* (2018.05); *H04N 13/31* (2018.05); *H04N 13/337* (2018.05); *H04N 13/341* (2018.05); *H04N 13/344* (2018.05); *H04N 13/366* (2018.05); *H04N 2213/001* (2013.01)

(56) References Cited

U.S. PATENT DOCUMENTS

| | | | | |
|---|---|---|---|---|
| 2011/0098083 | A1* | 4/2011 | Lablans | G03B 35/00 455/556.1 |
| 2011/0261167 | A1* | 10/2011 | Shin | H04N 13/0239 348/47 |
| 2012/0033051 | A1* | 2/2012 | Atanassov | H04N 13/0239 348/49 |
| 2013/0076870 | A1* | 3/2013 | Kitzen | H04N 13/0239 348/49 |
| 2013/0107011 | A1* | 5/2013 | Kim | H04N 13/0062 348/47 |
| 2013/0188022 | A1* | 7/2013 | Katz | G01S 17/10 348/47 |
| 2013/0209082 | A1* | 8/2013 | Cameron | H04N 13/025 396/323 |
| 2013/0215234 | A1* | 8/2013 | Lim | G06T 7/593 348/47 |
| 2014/0085423 | A1* | 3/2014 | Lee | H04N 13/0239 348/46 |
| 2015/0092066 | A1* | 4/2015 | Geiss | H04N 5/2258 348/180 |
| 2015/0254811 | A1* | 9/2015 | Sahu | H04N 13/0007 382/154 |
| 2016/0048968 | A1* | 2/2016 | Egri | G01C 3/085 382/106 |
| 2016/0316189 | A1* | 10/2016 | Lee | G03B 17/561 |
| 2017/0142407 | A1* | 5/2017 | Cho | H04N 13/0289 |

* cited by examiner

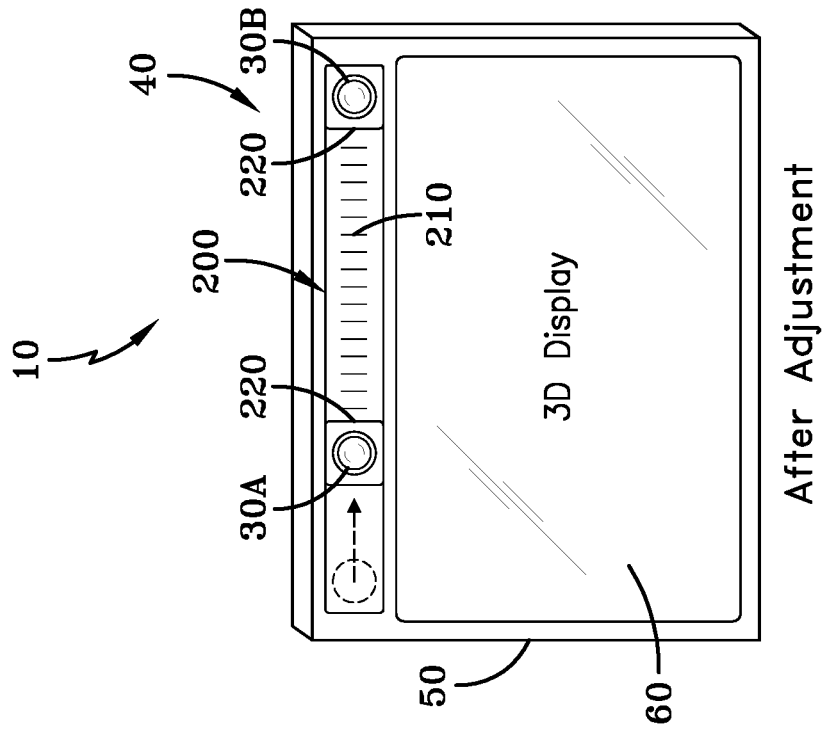
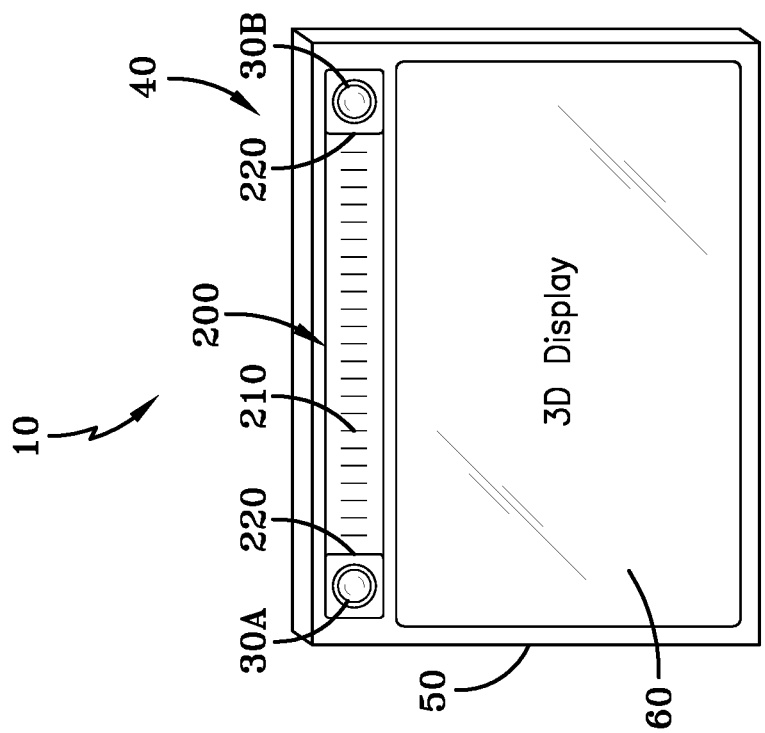

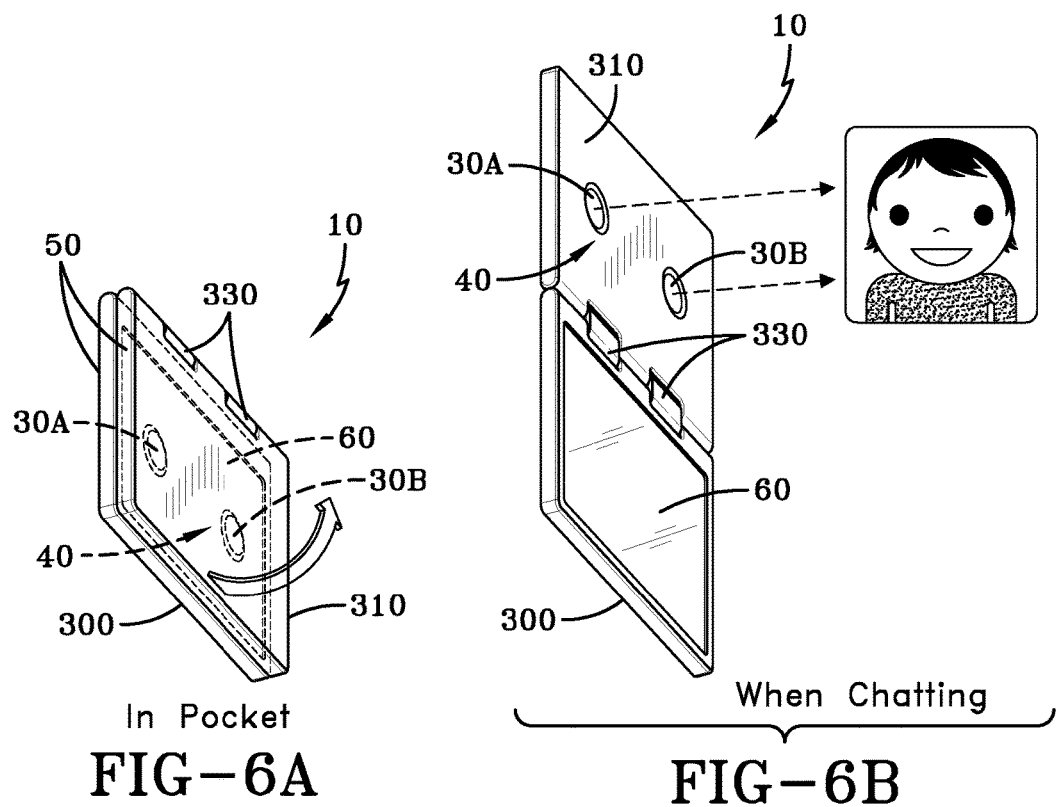
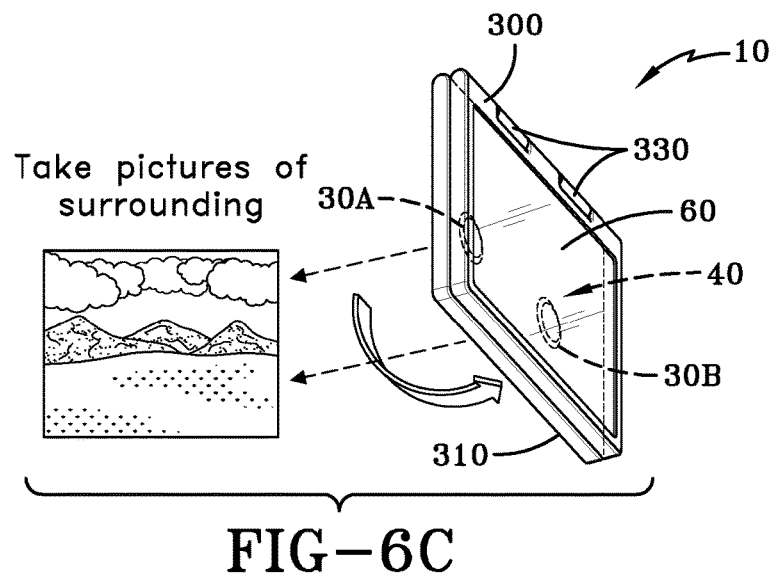

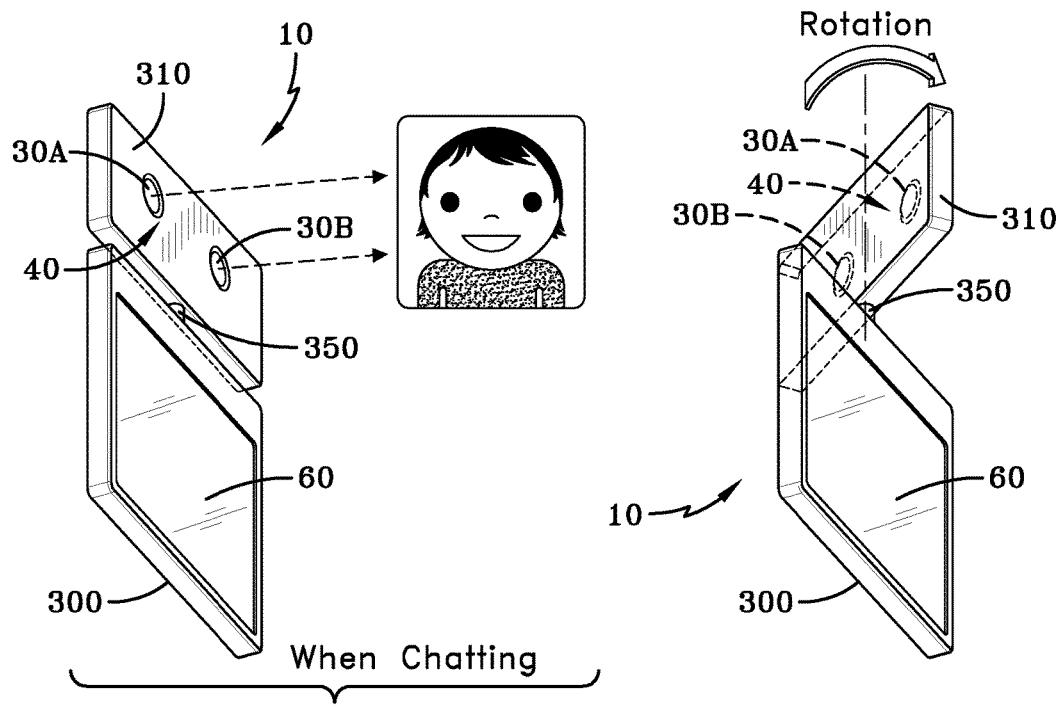
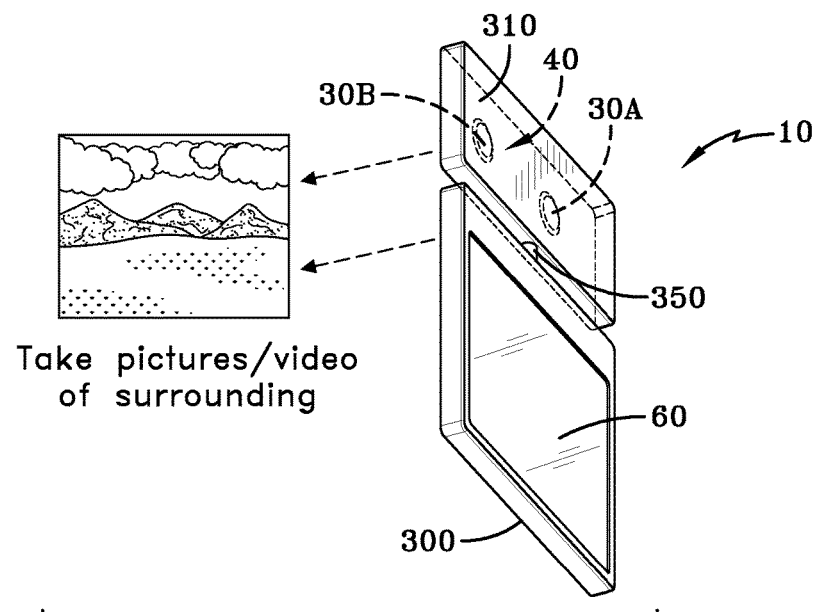

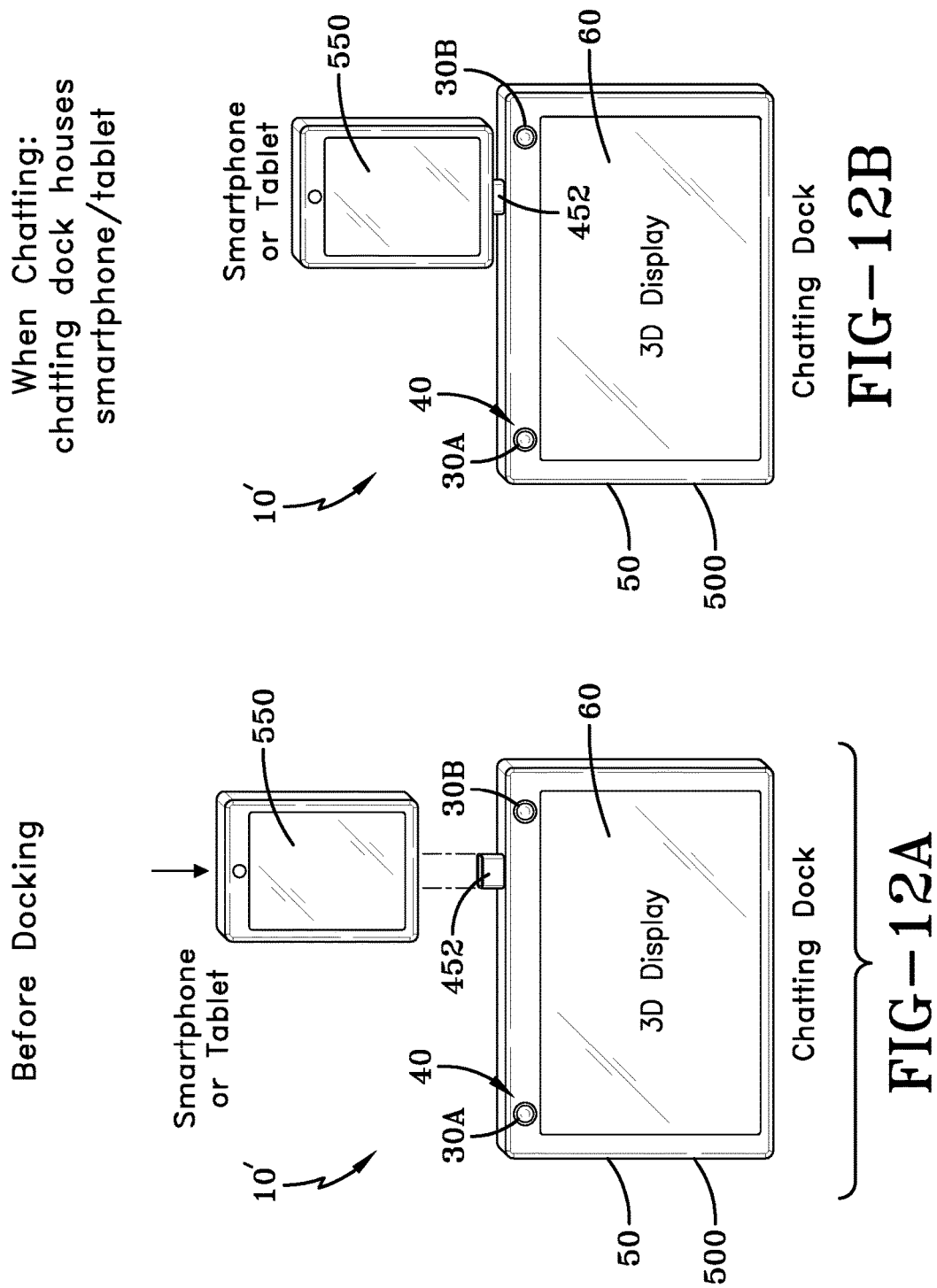

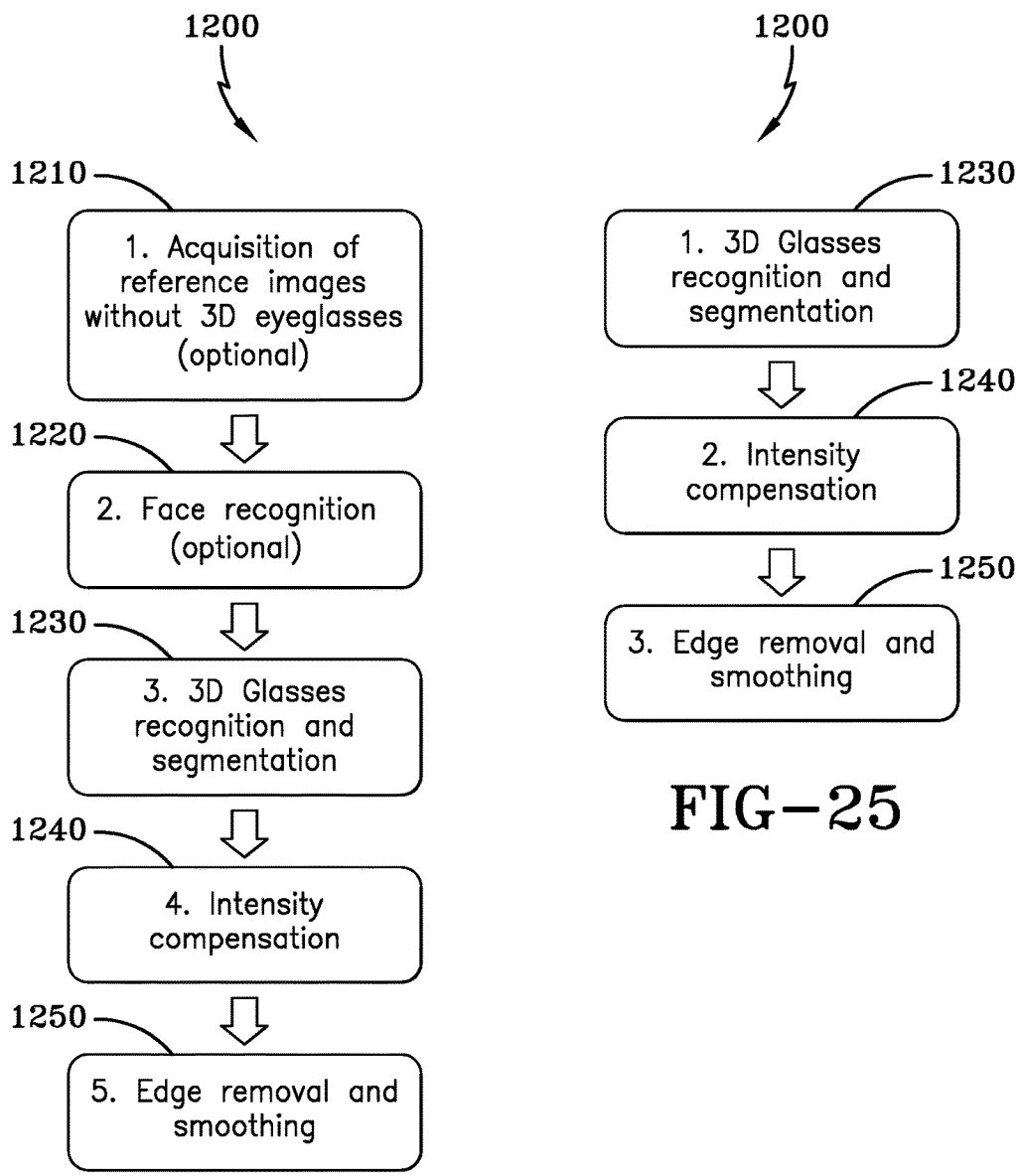

DEVICE AND METHOD FOR THREE-DIMENSIONAL VIDEO COMMUNICATION

CROSS-REFERENCE TO RELATED APPLICATION

This application claims the benefit of U.S. Provisional Application No. 62/037,781 filed Aug. 15, 2014, the contents of which are incorporated herein by reference.

TECHNICAL FIELD

Generally, the present invention relates to a device and method for three-dimensional (3D) video communication. In particular, the present invention relates to a device and method for 3D video communication, which utilizes a stereoscopic camera and 3D display to capture, communicate and display video images in three-dimensions. More particularly, the present invention relates to a device and method for 3D video communication, which includes a stereoscopic camera and 3D display to enable 3D video communication between a plurality of handheld devices over a communication network.

BACKGROUND OF THE INVENTION

Currently, video communication technologies, such as "video chat" applications provided by smartphones, allow individuals to communicate in real-time by video over a communication network, such as WIFI, as if they were in the same room. Such video chat technologies commonly carry-out the display of video content in a two-dimensional format, which has greatly facilitated personal and business communications. For example, video chat applications, such as Skype™ and Google Hangout™, which render video in a two-dimensional (2D) video format, have become very popular.

Recently, there has been a desire, primarily by smart phone manufacturers, to advance video communication technologies beyond two-dimensional (2D) communications to three dimensions (3D). While some smartphone devices offer the ability to playback pre-recorded 3D content, such as movies and pictures, and to record 3D content in the form of pictures and video, such devices are not capable of allowing video communication, or video chat, in three-dimensions.

Thus, while the capability of performing video communication or video chat in two-dimensions (2D) is currently available, it has many limitations, including the inability to render a realistic and immersive communication experience, as is capable in three-dimensional (3D) video.

Therefore, there is a need for a device and method for enabling three-dimensional (3D) video communication or video chat among remote users over a communication network.

SUMMARY OF THE INVENTION

In light of the foregoing, it is a first aspect of the present invention to provide a three-dimensional (3D) communication device for communication with one or more other communication devices, comprising a housing; a processor; a display carried by the housing and coupled to the processor; a stereoscopic camera carried by the housing and coupled to the processor, the stereoscopic camera configured to capture content in three-dimensions (3D); and a network communication device coupled to the processor to transmit the captured 3D content to the one or more other communication devices and to receive 3D content that is transmitted from the one or more other communication devices for presentation on the display in three-dimensions.

It is another aspect of the present invention to provide a three-dimensional (3D) communication device for use with a computing device having a communication interface, a network communication device, and a processor, the 3D communication device having a housing; a display carried by the housing and coupled to said processor; a stereoscopic camera carried by said housing, said stereoscopic camera configured to capture content in three-dimensions (3D); and a communication interface adapted to communicate with the communication interface of the computing device; wherein said display and said stereoscopic camera communicate with the processor of the computing device, such that the network communication device of the computing device is enabled to transmit said captured 3D content and to receive 3D content for presentation on said display in three-dimensions.

Still another aspect of the present invention is that a method of adjusting a distance between a pair of stereoscopic camera elements comprises the steps of providing a stereoscopic camera having a first and second camera element that are separated by a separation distance (i.e. inter-camera distance); determining a target distance between a plane defined by the first and second camera elements and a target object; and moving at least one of the first and second camera elements to change the separation distance based on the target distance.

Another aspect of the present invention is to provide a pair of eyeglasses for viewing content in three-dimensions (3D) that is formed entirely of a light polarizing material.

In addition, another aspect of the present invention is to provide a hat comprising a hat body configured to be worn on a head of a person; a lens body attached to the hat body, the lens body including a first lens and a second lens, wherein the first and second lenses have respective polarization angles that are orthogonal to each other.

Yet another aspect of the present invention is to provide a method of displaying an image comprising providing a camera and a processor in communication with the camera; capturing an image by the camera in three-dimensions (3D), wherein the image includes 3D glasses worn by a user; detecting the 3D glasses in the captured image; processing the captured image by the processor to remove the detected 3D glasses from to form a processed image; and displaying the processed image upon a display in 3D.

BRIEF DESCRIPTION OF THE DRAWINGS

These and other features and advantages of the present invention will become better understood with regard to the following description, appended claims, and accompanying drawings wherein:

FIGS. 5A-B are a schematic views of the 3D communication device that includes a 3D camera that includes adjustably positioned camera elements, that are configured to slide, and the 3D display, all of which are positioned on the same side of the housing of the 3D communication device in accordance with the concepts of the present invention;

FIGS. 6A-C are schematic views of exemplary embodiments of the 3D communication device, whereby the stereoscopic camera elements of the 3D camera are integrated on the front of the device, such that by moving a cover, a user can adjust the position and aiming angle of the individual camera elements of the stereoscopic 3D camera to a suitable position for video chatting (B), storage in a user's pocket (A) or for taking photos or videos of the surrounding environment (C), in accordance with the concepts of the present invention.

FIGS. 7A-C are a schematic views of exemplary embodiments of the 3D communication device, whereby a stereoscopic 3D camera is integrated on a rotating portion of the device, such that by rotating, a user can adjust the position and aiming angle of the camera elements of the stereoscopic 3D camera to a suitable position for chatting (A), for taking 3D photos/videos (B), or for taking 3D photos/videos of the surrounding environment (C) in accordance with the concepts of the present invention;

FIGS. 12A-B are schematic views of an exemplary embodiment of the 3D communication device, which is provided as a dock that is configured to physically dock to a smartphone/tablet or other portable computing device in accordance with the concepts of the present invention;

FIG. 24 is a flow diagram showing the operational steps that are performed to digitally remove the appearance of the "invisible" 3D glasses from the images that are captured/received by the 3D communication device in accordance with the concepts of the present invention; and FIG. 25 is a further flow diagram showing the operating steps that are performed to digitally remove the appearance of the "invisible" 3D glasses from the images that are captured/received by the 3D communication device in accordance with the concepts of the present invention.

DETAILED DESCRIPTION OF THE INVENTION

Figure 1:
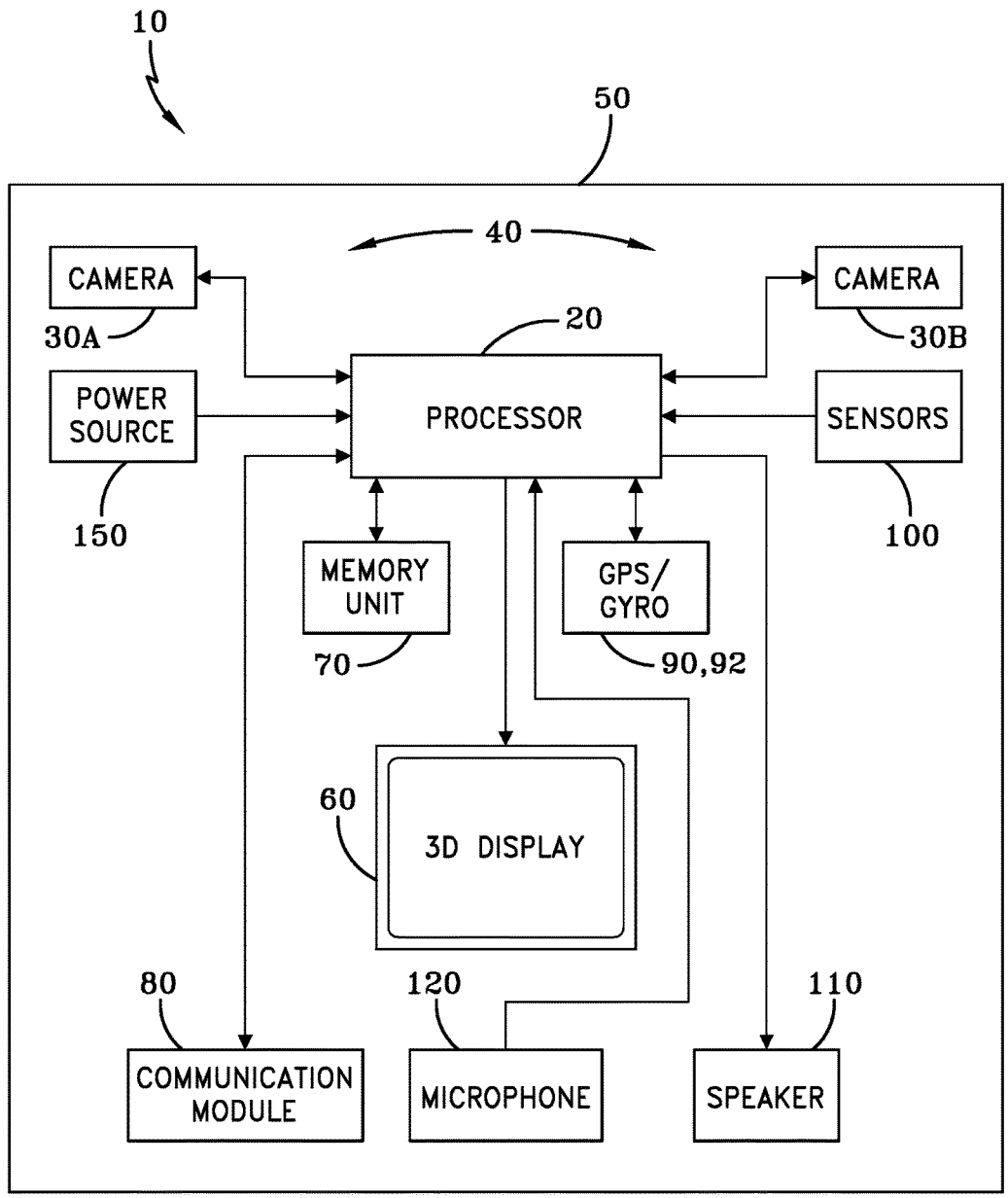
FIG. 1 is a block diagram of a device for 3D communication between remote users over a wired or wireless communication network in accordance with the concepts of the present invention.
Figure 3:
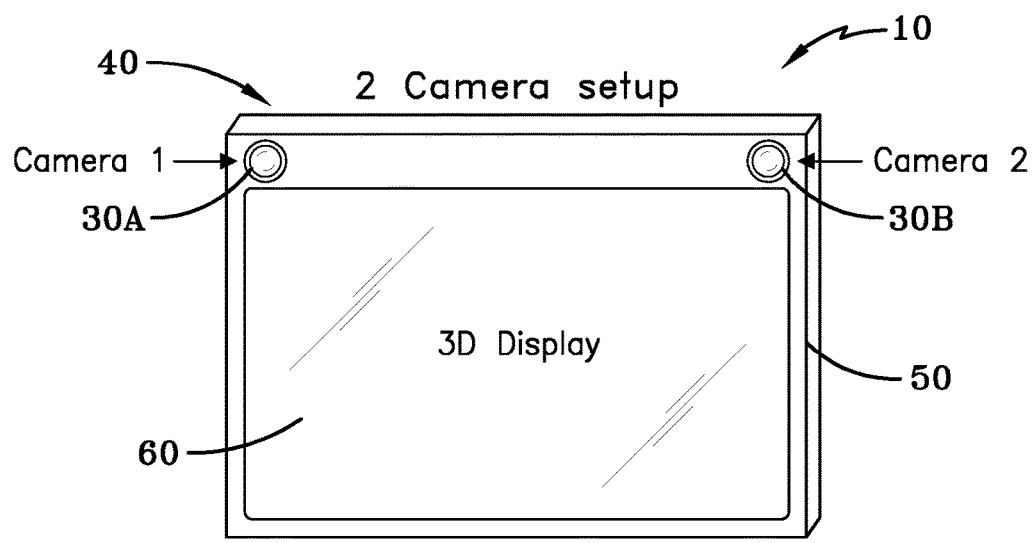
FIG. 3 is a schematic view of the 3D communication device that includes a 3D camera having two camera elements and a 3D display, which are all positioned on the same side of the housing of the 3D communication device in accordance with the concepts of the present invention.

A device for three-dimensional communication is generally referred to by numeral 10, as shown in FIG. 1 of the drawings. Specifically, the communication device or apparatus 10 includes a controller/processor 20 that includes the necessary hardware, software or combination thereof for carrying out the functions to be discussed. Coupled to the controller 20 are two or more camera elements 30A-B, which work together to form a stereoscopic or 3D camera 40, which is configured to obtain or capture a stereoscopic or three-dimensional (3D) image, as shown in FIG. 3. For example, the camera elements 30A-B of the 3D camera may be carried by a housing 50, so that they face any desired direction. In one aspect, the camera elements 30A-B may be positioned to face toward the user of the apparatus 10 (i.e. local user) when the housing 50 is held in a user's hand; or alternatively positioned to face away from the user of the apparatus 10, when the housing 50 is held in a user's (i.e. local user) hand. However, it should be appreciated that the camera elements 30A-B may be positioned at any desired position on the housing 50. The 3D video or picture images captured by the 3D camera 40 may be presented in three-dimensions on a 3D display 60 that is coupled to the controller 20. However, in some embodiments, the 2D video of the local user of the apparatus or device 10 can be captured by the camera while the 3D stereoscopic video captured by one or more remotely located users of the device 10 (i.e. remote chatter or user) is presented simultaneously on the 3D display 60 of the local user in a manner to be discussed.

Figure 2A:
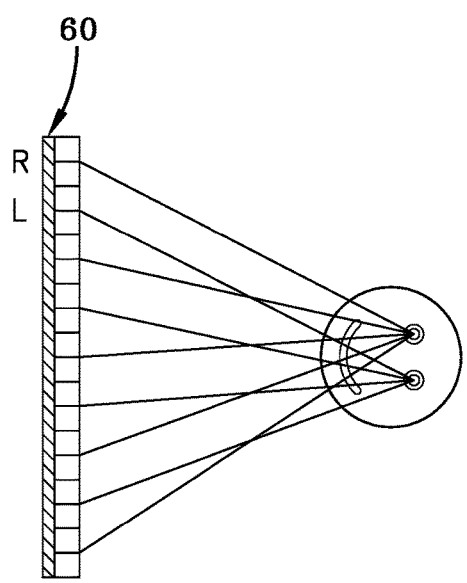
FIG. 2A is a schematic view of a lenticular display that focuses the line of sight from the left eye onto only pixels from the left camera, and that focuses the line of sight from the right eye onto only pixels from the right camera in accordance with the concepts of the present invention.
Figure 2B:
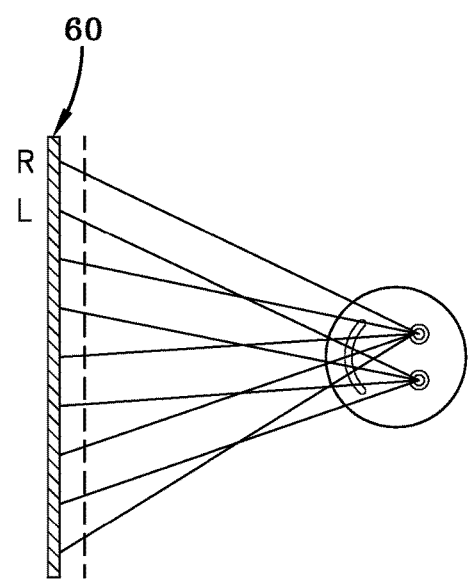
FIG. 2B is a schematic view of a parallax barrier that blocks the right eye from seeing left camera images, and that blocks the left eye from seeing right camera images by means of a grating in accordance with the concepts of the present invention.

Furthermore, in some embodiments, the 3D display 60 may comprise a glasses-free 3D display, which utilizes autostereoscopy by way of a parallax barrier or lenticular lens. Such glasses-free systems do not require the use of glasses to view 3D video of photos on the 3D display 60. That is, by the use of a parallax barrier or lenticular display, the need for specialized glasses is negated for visualizing images with a 3D effect. For example, utilizing a parallax barrier display, the left and right stereoscopic images are interlaced to create a single image of alternating left and right eye vertical pixel columns, as shown in FIGS. 2A-B. A barrier of vertical slits is placed in front of this image so that each eye is forced to focus on a different image, whereby the left eye only sees the left image pixels, and the right eye only sees the right image pixels. Lenticular 3D displays function in a manner similar to that of a parallax barrier, such that they only focus each eye on the appropriate pixel columns through the use of a lens array rather than a barrier.

Although autostereoscopy using a parallax barrier or lenticular lens may be used by the 3D display 60, other 3D display technologies can be used, including but not limited to: polarized 3D systems, polarization glasses-based systems (linear or circular polarized light), active shutter 3D systems, liquid crystal shutter glasses, volumetric displays, holographic displays, integral imaging, compressive light field displays, etc.

The 3D communication device 10 also includes a memory unit 70, which allows the controller 20 to store and retrieve data, such as 3D image data that is captured by the 3D camera 40. A communication module 80 is also coupled to the controller 20, which enables the apparatus 10 to communicate 3D video/photo data captured by the 3D camera 40 over a wired or wireless network, or combination thereof, with any other compatible video communication apparatus. For example, the communication module 80 may utilize any suitable wireless data communication format/protocol, such as a WIFI, BLUETOOTH, NFC (near-field communication), 3G, 4G, and LTE (long-term evolution), as well as any suitable wired communication format/protocol, such as Ethernet. It should also be appreciated that in some embodiments, the communication module 80 comprises an infrared (IR) communication module that is capable of carrying out infrared communication using infrared light.

In addition, the 3D communication device 10 may include a GPS (global positioning sensor) receiver 90, as well as a gyroscope sensor 92, which are coupled to the controller 20. As such, the GPS receiver 90 allows the 3D communication apparatus 10 to identify its location, while the gyroscope sensor 92 is capable of determining movement, such as change in velocity, acceleration heading, and elevation of the apparatus 10. It should also be appreciated that various other sensors 100 may be coupled to the controller 20, Including but not limited to a temperature sensor, proximity sensor, and range finder.

In order to permit the acquisition and playback of sound, such as a local or remote user's speech, the 3D communication device 10 may include a speaker 110 and a microphone 120. In one embodiment, the microphone 120 and the 3D camera 40 are able to operate together, so that the video and audio that are captured are synchronized to enable communication between a local user and one or more remote users of the device 10 that are in communication with each other in a manner to be discussed. Furthermore, in some embodiments, the speaker 110 may be capable of generating surround sound. Audio output may also be generated by the speaker 110 or by remote speakers attached or interfaced with the 3D communication device 10 through a wired or wireless audio output connection, such as BLUETOOTH.

To power the apparatus 10, a power source 150 is coupled to the controller 20, and may comprise any suitable power device, such as a battery, solar power, fuel cell, or the like.

It should be appreciated that the 3D communication device 10 of the present invention may also be embodied by any suitable computing device, including but not limited to smartphones, tablets, laptops, personal computers, smart watches, and smart wearable devices, which are capable of communicating with one or more other computing devices over a wired or wireless data network, such as 3G, 4G, WIFI, Internet/Ethernet, BLUETOOTH, RF (radio frequency), or IR (infrared) for example.

Thus, while the 3D communication device 10 may be used to conduct video chat/share video or photos between a local user and one or more remote users, the device 10 may be used to enable the 3D display of photos/videos at a local device 10, which has been captured by a remote user of the device 10. For example, the 3D display 60 is capable of displaying photos or video that the local device 10 has acquired itself or has received from any other remote device 10 or any other remote computing device, which has acquired video or photo data.

Figure 4:
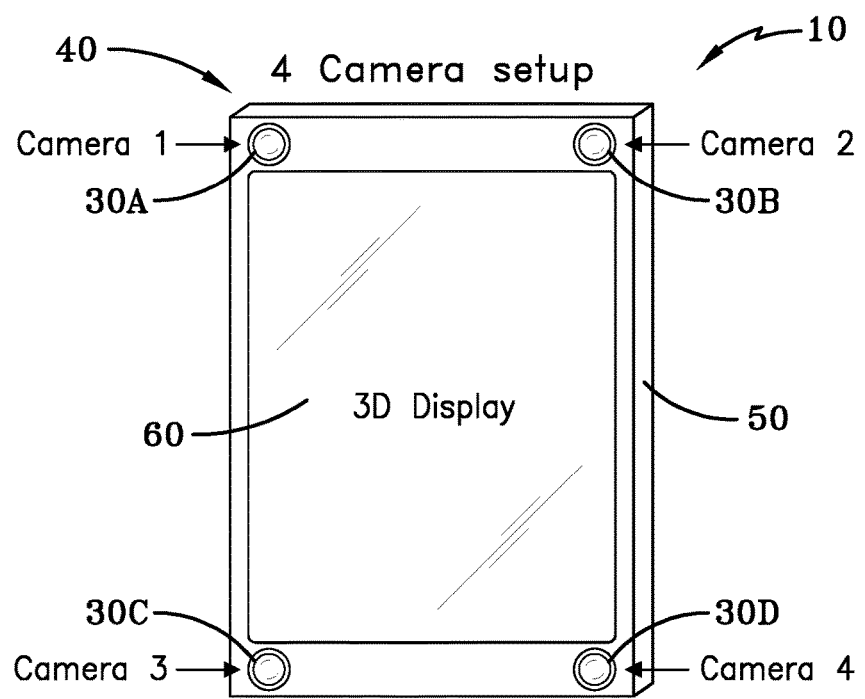
FIG. 4 is a schematic view of the 3D communication device that includes a 3D camera that includes four camera elements and the 3D display, which are all positioned on the same side of the 3D communication device in accordance with the concepts of the present invention.

In other embodiments, the two camera element 30A-B configuration comprising the 3D camera 40 may be replaced with a four camera element 30A-D configuration, as shown in FIG. 4. Thus, the 3D camera 40 includes a plurality of camera elements 30A-D, which can be used together, in pairs or sets, to capture 3D video and photos, while the 3D display 60 presents 3D video acquired by camera elements 30A-D. The use of four camera elements is advantageous in that according to the distance between the user and the device 10, two or more of the four total camera elements 30A-D can be used for capturing a 3D video. For instance, at close distance, camera elements 30A and 30B can be used; at a medium distance, camera elements 30A and 30C can be used; and at longer distances camera elements 30A and 30D can be used. In yet another embodiment, camera elements 30A-D may be laid out on a linear line, so that the distances between camera elements 30A and 30B, the distances between camera elements 30A and 30C, and the distances between camera elements 30A and 30D are different. It should be appreciated that the distance between such camera combinations is different, so as to accommodate the particular distance the user is from the camera elements 30, so as to optimize the 3D video image being captured. It should be further appreciated that other numbers of camera elements 30 (n>2; eg. n=3, 4, 5, 6 . . . ) are also possible. It should also be appreciated that the 3D communication device may include multiple sets of two stereoscopic camera elements 30A-B, whereby at least one set of stereoscopic camera elements 30A-B (i.e. forward facing cameras) are disposed on the same side of the housing as the 3D display 60 for capturing video/photo image data of the user of the apparatus 10, so as to enable 3D video communication with remote users of an apparatus 10. In addition to the forward facing cameras 40, there may be more than one set of two stereoscopic camera elements 30A-B (i.e. rearward facing cameras) on the other side of the apparatus 10, which enable the acquisition of 3D or 2D video images, or photos of a user's surroundings.

In another embodiment, the 3D communication device 10 may be configured such that the distance between each of the two of the camera elements 30A-B of a particular 3D camera 40 is able to be changed, so as to change the inter-camera distance therebetween, either manually or automatically. In some embodiments, both camera elements 30A-B of a given 3D camera 40 are permitted to move, while in other embodiments one of the camera elements, such as 30A, remains fixed in position, while the other camera element, such as 30B, is permitted to move relative to the fixed camera element 30A. Thus, by changing the distance between the camera elements 30A and 30B, the stereoscopic effect and quality of the 3D video and photos that are captured by the 3D camera 40 can be ensured. The movement of one or more camera elements 30 may be carried out by a track mechanism 200 that is provided by the housing 50 of the apparatus 10, as shown in FIGS. 5A-B. The track mechanism 200 provides one or more of the camera elements 30 so that they are carried slideably on a slideable track 210, so that the distance between the two camera elements 30A and 30B of the stereoscopic 3D camera 40 can be changed. In some embodiments, the camera elements 30A-B may each be slid manually on the track 210 to the desired distance by the application of physical force from a user's fingers', however in other embodiments only one common element may be slideable. In other embodiments, the slideable track 210 may comprise an electromechanical device that is coupled to the controller 20 of the 3D apparatus 10, which includes one or more carriages 220 that carry a single camera element 30 thereon, and are driven upon the receipt of control signals from the controller 20. For example, the movement of one or more camera elements 30A-B of the 3D camera 40 to the desired inter-camera distance may be automatically performed by the controller 20 based on the distance that is calculated by the controller 20 that is between the user or environment (i.e. target object) and the apparatus 10 using known measurement techniques. That is, the controller 20 can calculate the distance between the camera elements 30 and the user (target object) by computing a disparity map between images captured by the two camera elements 30A-B; the distance between the two camera elements 30A-B can be adjusted based on the estimated distance, so as to optimize the 3D effect and quality of 3D video. Moreover, the angle at which the camera elements 30A-B point at the user of the apparatus 10 can also be changed if needed by incorporating a pivoting mechanism (not shown) with the moveable carriage 220. Furthermore, in some embodiments, a fixed camera element 30 may also be carried by a pivoting mechanism to obtain the optimum angle.

In still other embodiments, the device 10 may be foldable, as shown in FIGS. 6A-C. For example, the housing 50 of the 3D communication device 10 may have two sections, a base section 300 and camera section 310 that are pivotably or foldably connected to each other by a hinge 330. The camera section 310 may include one or more 3D cameras 40 that include camera elements 30A-B, while the base section 300 includes the 3D display 60. Thus, when storing the apparatus 10 in a user's pocket, the stereoscopic camera elements 30A-B face the 3D display 60; and when unfolded, the stereoscopic camera elements 30A-B face the user. In addition, the camera section 310 may be further folded so that the stereoscopic camera elements 30A-B are able to take 3D pictures or video of the surrounding environment. In addition, an optional secondary display (not shown) may be integrated on the base section 300, so that the user is still able to directly view the display 60 when the 3D communication device 10 is in the folded orientation.

In other embodiments, the 3D communication device 10 may be configured whereby the base section 300 and the camera section 310 are pivotable or rotatable relative to each other by a pivoting or rotating coupling 350, as shown in FIGS. 7A-C. As such, the camera section 310 can be rotated so that the stereoscopic camera elements 30A-B can selectively face the user of the 3D communication device 10 or face the surrounding environment. For example, one or more 3D cameras 40 may be disposed on the camera section 310. As such, the camera section 310 is permitted to be rotated through any desired angle, so as to allow the position and aiming angle of the 3D camera 40 to be moved to a desired position for 3D communication, or for taking 3D video and photos of the surrounding environment.

Figure 8:
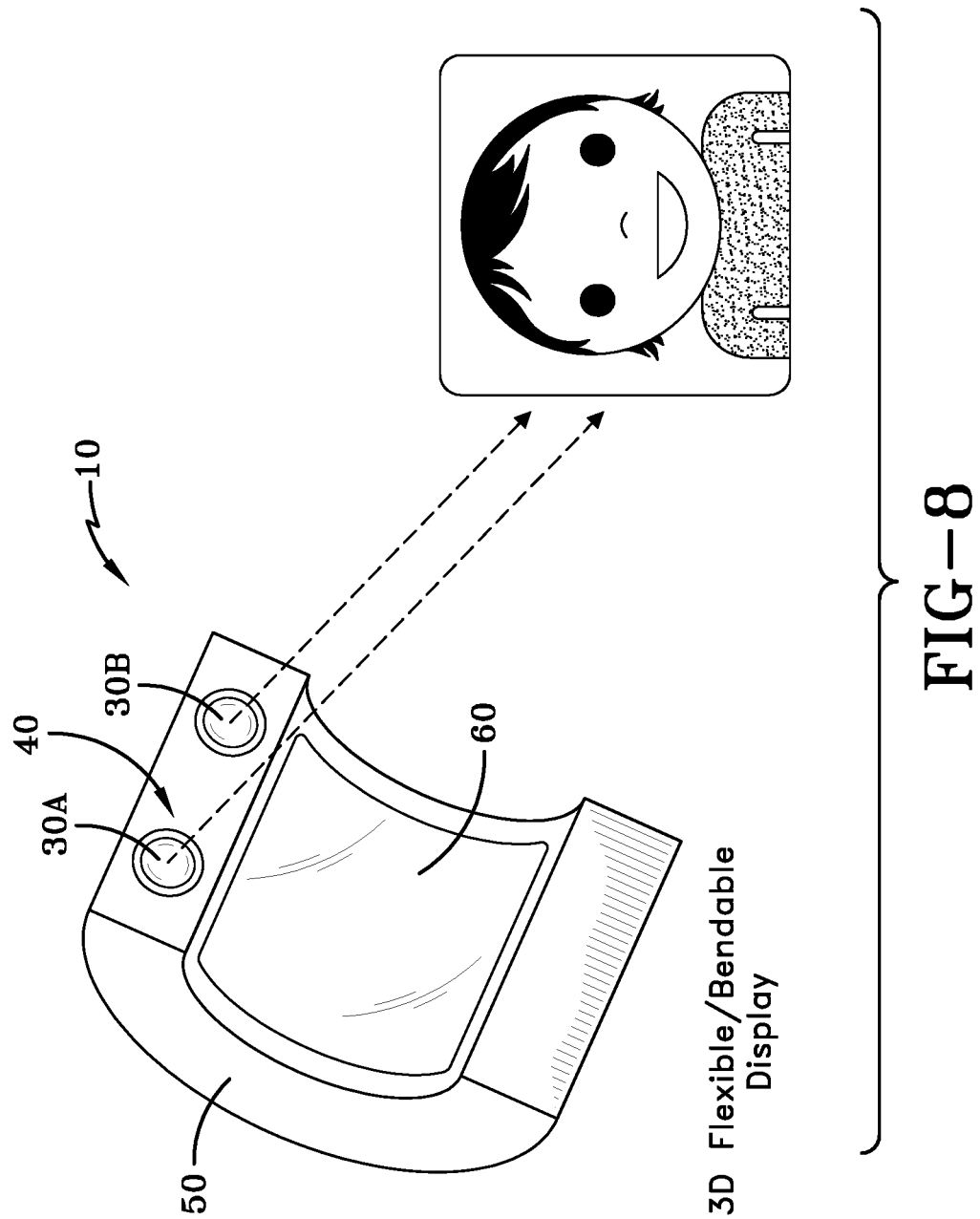
FIG. 8 is a schematic view of an exemplary embodiment of the 3D communication device, which uses a flexible/bendable 3D display and housing, such that the 3D communication device can be bent to aim the stereoscopic 3D camera as he or she desires in accordance with the concepts of the present invention.

In other embodiments, the 3D communication device 10 may be configured so that the housing 50 and the other components of the device 10 carried therein are capable of being foldable or bendable, so as to allow the user to bend the housing 50 so as to adjust point of view or field of view of the stereoscopic camera 40 as he or she wishes, as shown in FIG. 8.

Figure 9:
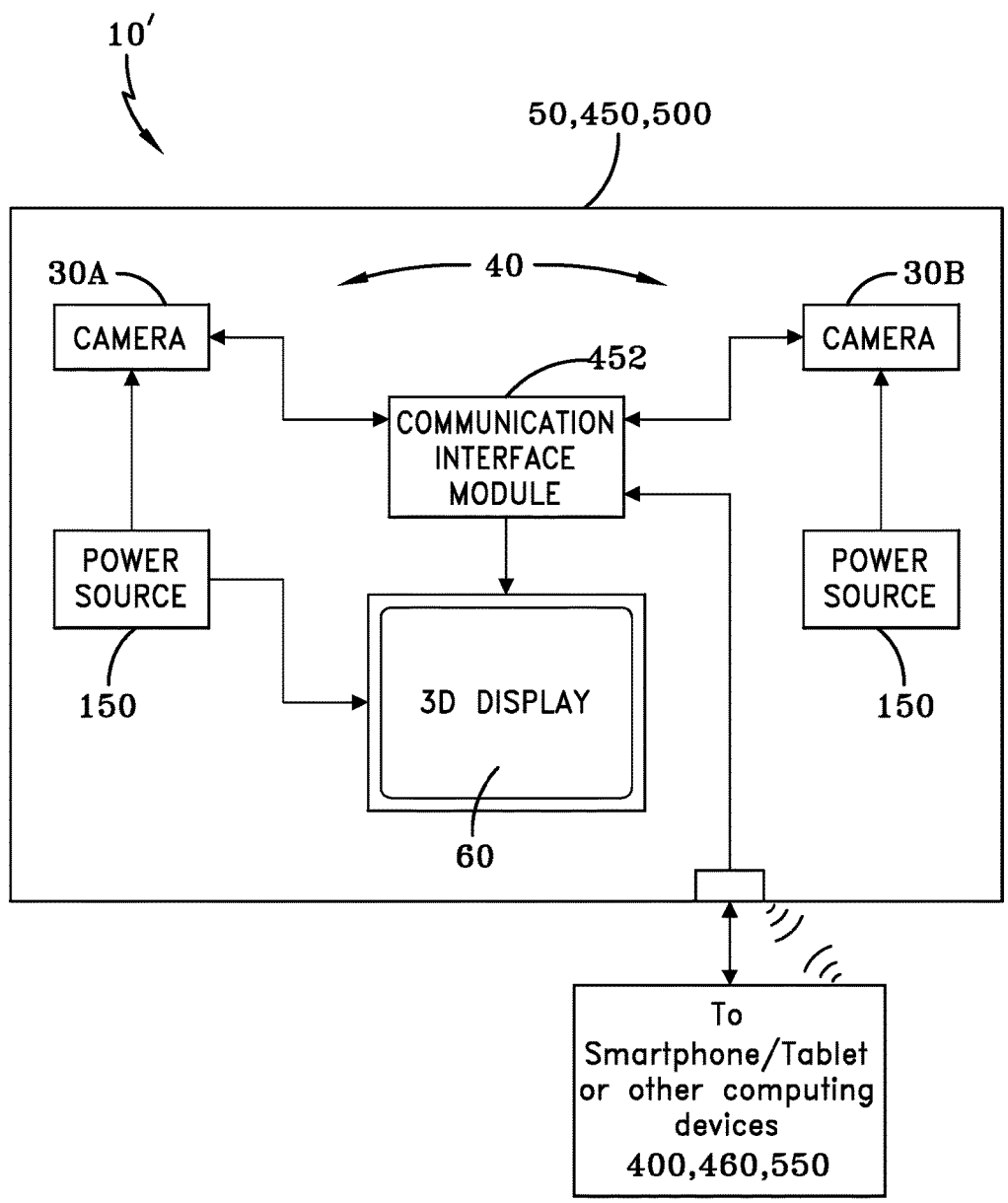
FIG. 9 is a block diagram of another embodiments of the device for 3D communication that is configured for use as a modular component, including a case or dock, for wired or wireless attachment to a smartphone/tablet or other computing device, such as a portable computing device in accordance with the concepts of the present invention.
Figure 10A:
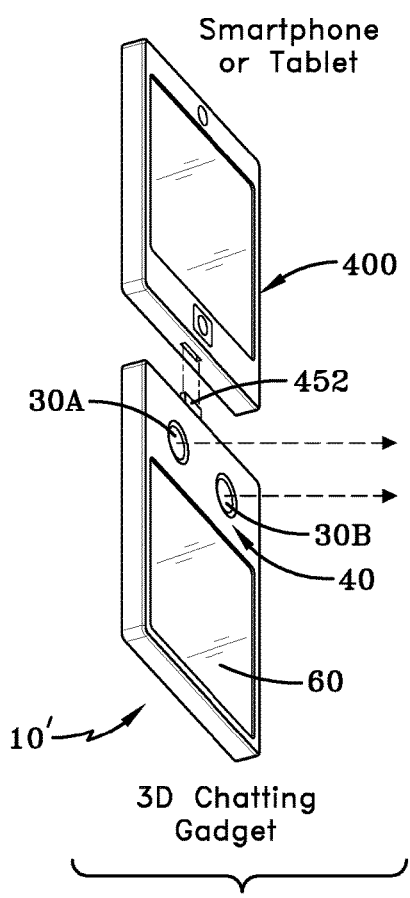
FIGS. 10A-C are schematic views of an exemplary embodiment of the 3D communication device, which is provided as a modular component for wired or wireless attachment to a smartphone/tablet or other portable computing device in accordance with the concepts of the present invention.
Figure 10B:
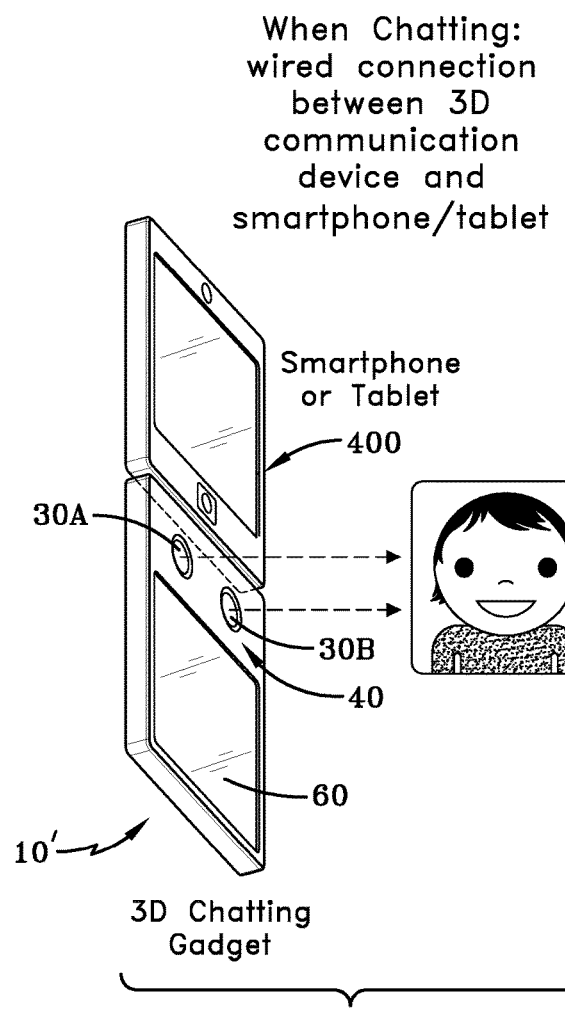
Figure 10C:
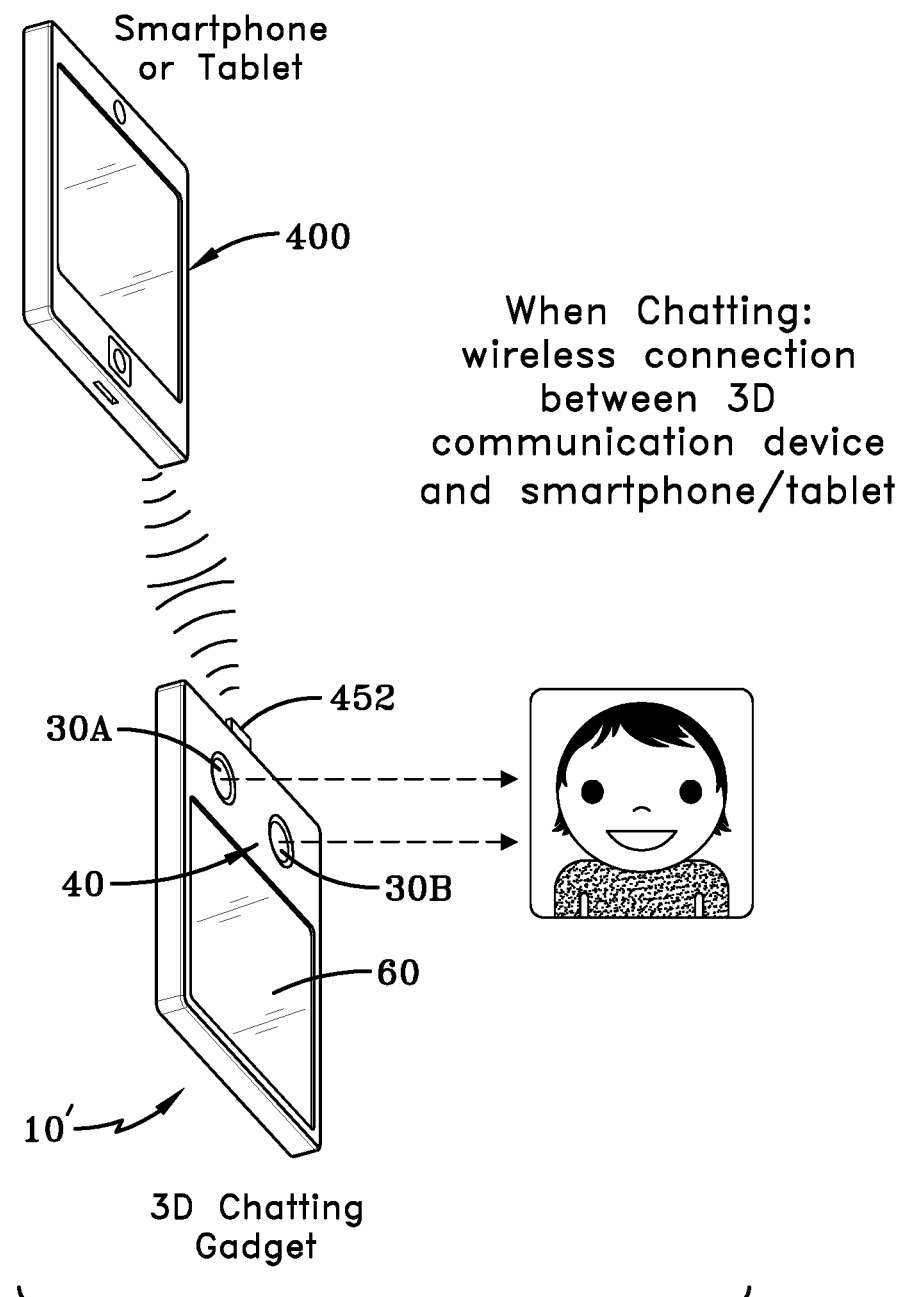

In further embodiments, the 3D communication device 10 may be configured as a modular 3D communication device 10', as shown in FIG. 9, which includes a communication interface module 452, which is configured to be interfaced with a non-3D enabled mobile communication device or other computing device 400, 460 via a wired or wireless connection. Furthermore, the modular 3D communication device 10' is similar to the 3D communication device 10, in that includes the stereoscopic camera 40 and 3D display 60, however the module device 10' is configured to utilize, via the communication interface module 452, the data processing and cellular data communication capabilities of the mobile communication device/computing device 400,460 to which the modular device 10' is interfaced, such as a smartphone/tablet. It should also be appreciated that the modular case or housing 450 of the 3D communication device 10 may optionally include a power supply that is configured to charge the non-3D enabled mobile communication or computing device 400,460 when they are wired together, such as by a wired connection or a wireless inductive connection. For example, as shown in FIGS. 10A-C, the non-3D enabled mobile communication device 400 may include a smartphone, a tablet, a laptop computer, a desktop, or any other data communication or computing device, which lacks 3D communication or display capabilities. The connection between the communication interface module 452 of 3D communication device 10' of the present invention and the non-3D enabled mobile communication device 400 may be achieved through any suitable wired or wireless communication interface, including but not limited to: Mobile High-Definition Link (MHL); USB (universal serial bus), including Mini and Micro USB; HDMI (high-definition media interface), including type A, B, C, D and E; DisplayPort (including Mini DisplayPort and Micro DisplayPort); WIFI; Internet/Ethernet; 4G; 3G; BLUETOOTH; and RF communications.

Figures 11A, 11B:
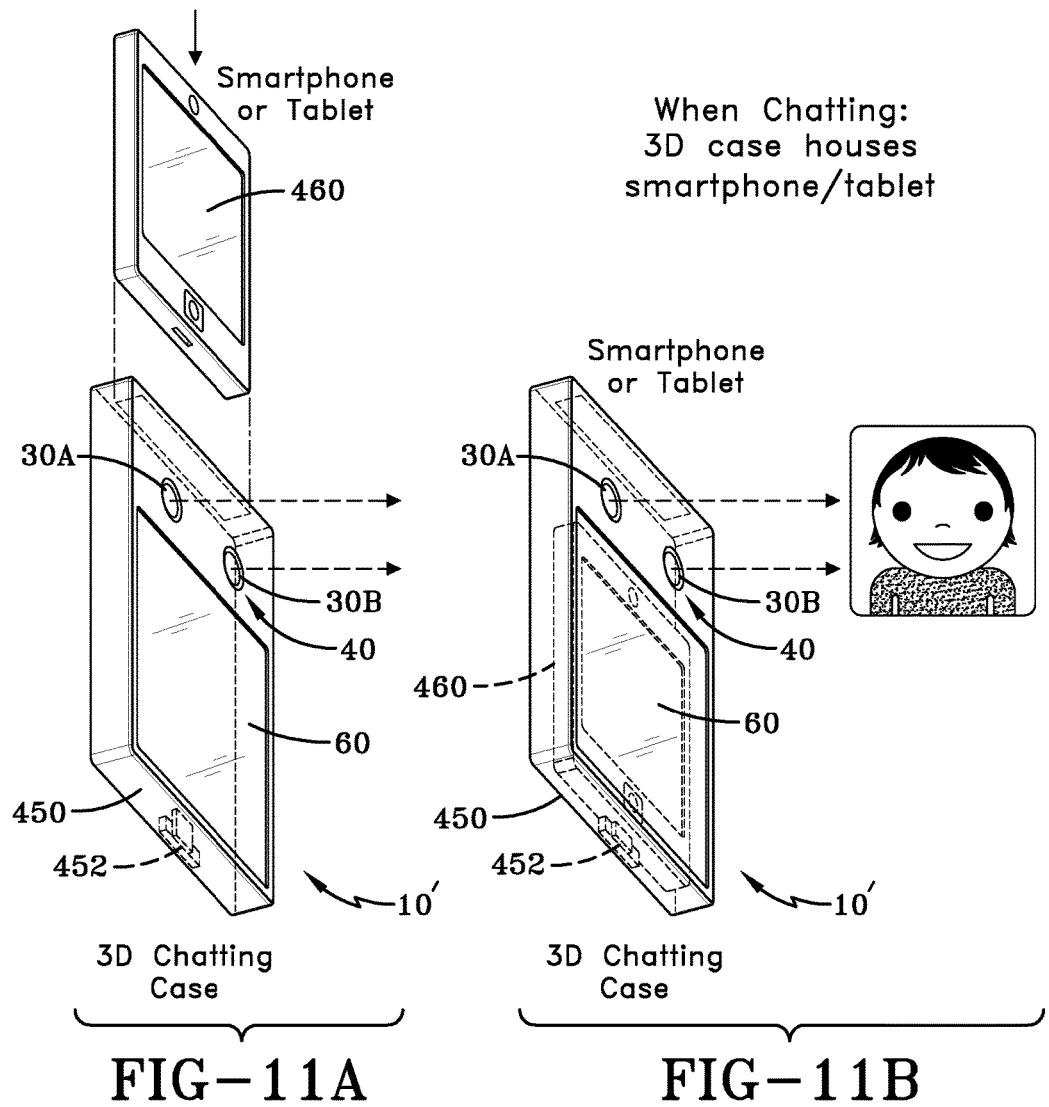
FIGS. 11A-B are schematic views of an exemplary embodiment of the 3D communication device, which is configured as a case for a smartphone/tablet or other portable computing device in accordance with the concepts of the present invention.

In another embodiment, the 3D communication device 10' may be configured so that the housing 50 is configured as a modular case, housing or shell 450 that is designed for physical attachment to a non-3D enabled device, such as a smart phone, tablet, computers, smart wearable devices or any other mobile communication or computing device 460, whereby the case housing 450 includes the stereoscopic 3D camera 40 and/or 3D display 60, as shown in FIGS. 11A-B. In particular, the case housing 450 may be configured to accommodate the design of specific mobile computing device 460 for precise fit. In addition, the case housing 450 may include an adjustable locking mechanism to facilitate the attachment to the non-3D enabled mobile communication device 460. As previously discussed, the connection between the modular case 450 of the 3D communication device 10' and the mobile communication device 460 may be achieved through the communication interface module 452 using any suitable wired or wireless communication interface, including but not limited to: Mobile High-Definition Link (MHL); USB (universal serial bus), including Mini and Micro USB; HDMI (high-definition media interface), including type A, B, C, D and E; DisplayPort (including Mini DisplayPort and Micro DisplayPort); WIFI; Internet/Ethernet; 4G; 3G; BLUETOOTH; and RF communications. As such, the stereoscopic camera 40 of the device 10' is able to capture digital 3D content, such as videos and photos, as well as perform 3D communication; and the 3D display 60 is able to display the user of a remote apparatus or any other content captured by the remote user in 3D. As such, the 3D communication device 10, when configured as a modular device, as shown in FIG. 9, to use the case housing 450, is reliant on the processor of the mobile communication device 460 to which the 3D communication device 10' is attached to facilitate the processing of 3D video and photos that are captured, displayed and communicated. In addition to the processor 20, the 3D communication device 10' may also be configured to exclude the memory unit 20, communication module 80, speaker 110 and microphone 120, such that the 3D communication device 10', when using the case housing 450, is reliant on the corresponding components (i.e. hardware/software) of the non-3D enabled mobile communication device 400 for such functions. It should also be appreciated that the modular case or housing 450 of the 3D communication device 10' may also include a power supply that is configured to charge the non-3D enabled mobile communication or computing device 460 when they are wired or wirelessly coupled together, such as by a wired connection or a wireless inductive connection.

In yet another embodiment, the housing 50 of the 3D communication device 10' may comprise a docking device 500, which is configured to include the 3D display 60 and the stereoscopic camera 40, as shown in FIGS. 12A-B. In particular, the docking device 500 may be configured to accommodate the design of specific non-3D enabled mobile communication or computing devices 550 for precise fit. Examples of such communication or computing devices include but are not limited to: smartphones, tablets, laptops, desktops and smart wearable devices. In addition, the dock 500 may include an adjustable locking mechanism to facilitate the attachment to the mobile communication device with the dock 500. It should also be appreciated that the dock 500 may also include a power supply that is configured to charge the non-3D enabled mobile communication device 550 when they are coupled together, such as that discussed above. The dock 500 may also provide inputs for external peripherals, such as a keyboard and mouse for example, which can be used to interact with functions provided by the dock 500 and/or the non-3D enabled mobile communication device 550. The connection between the dock 500 and the non-3D enabled mobile communication device 550 may be achieved through the communication interface module 452 using any suitable wired or wireless communication interface, including but not limited to: Mobile High-Definition Link (MHL); USB (universal serial bus), including Mini and Micro USB; HDMI (high-definition media interface), including type A, B, C, D and E; DisplayPort (including Mini DisplayPort and Micro DisplayPort); WIFI; Internet/Ethernet; 4G; 3G; BLUETOOTH; and RF communications. As such, the stereoscopic camera 40 of the dock 500 will be able to capture 3D content, including video and photos, as well as perform for wireless 3D video communication; while the 3D display 60 of the dock 500 is able to display the user of a remote apparatus 10 in 3D, such as in the case of a chat. As such, the stereoscopic camera 40 of the device 10' is able to capture digital 3D content, such as videos and photos, as well as perform 3D communication; and the 3D display 60 is able to display the user of a remote apparatus or any other content captured by the remote user in 3D. As such, the 3D communication device 10', when configured to use the dock 500, does not use the processor 20 of the device 10', and is therefore reliant on the processor of the mobile communication device 550 to which the 3D communication device 10' is attached to facilitate the processing of the 3D video and photos that are captured, displayed and communicated. In addition to the processor 20, the 3D communication device 10' may also be configured to exclude the memory unit 20, communication module 80, speaker 110 and microphone 120, such that the 3D communication device 10', when using the dock 500, is reliant on the corresponding components (i.e. hardware/software) of the non-3D enabled mobile communication device 400 for such functions. Thus, the dock 500 is configured to use the processing capabilities and wireless communication capabilities of the mobile communication or computing device 550 to which it is attached to facilitate the capture, display and communication, in the case of chatting, of 3D video and photos. For example, the processor, data memory and other data storage of the mobile communication device 550, as well as the wireless or wired communication capability, including but not limited to WIFI, Ethernet, LAN, 3G or 4G, of the mobile communication device 550, may be used for 3D communication purposes, such as chatting.

It should also be appreciated that the various features discussed herein are equally applicable to both 3D communication devices 10 and 10', and as such, the discussion herein of features relating device 10 also applies to device 10'.

In other embodiments, the 3D communication device 10 may be configured to utilize "dynamic perspective" display features to simulate a 3D display.

Additionally, in other embodiments, the 3D communication device 10 may also include an audio recording system. Alternatively, in any of the embodiments of the apparatus 10 discussed herein, such as the modular housing, case or dock, an audio recording system may be included therein, Alternatively, the modular housing, case or dock may utilize the audio recording system that is provided by the non-3D enabled portable communication device.

Thus, with the configuration of the various embodiments of the 3D communication device 10 set forth, the following discussion relates to the operation of the 3D communication device 10. As such, users of the device 10 may communicate with other individuals in accordance with the following combinations:

1. Both users (i.e. a local user and a remote user) are each utilizing a separate 3D communication device 10;
2. Users are communicating between a 3D communication device 10 and a conventional 3D monitor, TV or projector in conjunction with a stereoscopic camera;
3. Users are communicating between a 3D communication device 10 and a conventional wearable head-mounted 3D display in conjunction with a stereoscopic camera.
4. Users are communicating between a 3D communication device 10 and a computer having both a 3D display and a stereoscopic camera.
5. Users are communicating between a 3D communication device 10 and a 2D capable device (this allows only 2D communication or chat to be enabled).

It should be appreciated that multiple users (n>2) who each have a 3D communication device 10 can video chat or conference with each other in 3D. In that case, the 3D display 60 may be divided into multiple segments or sections to display user 1, user 2, user 3, etc. simultaneously. It should also be appreciated that a picture-in-picture 3D mode may be also included.

Although the 3D communication apparatus 10 has been discussed as using autostereoscopy, it should be appreciated that the device 10 may use any other 3D display technology, including but not limited to: polarized 3D systems, polarization glasses-based systems (linear or circular polarized light), active shutter 3D systems, anaglyphs, liquid crystal shutter glasses, volumetric displays, holographic displays, integral imaging and compressive light field displays. Thus, the following discussion presents the manner in which various 3D display technologies may be utilized by the 3D communication device 10 of the present invention.

In an embodiment where the 3D display 60 of the 3D communication device 10 uses anaglyphs, the following discussion is presented. In particular, anaglyphs utilize color filtering to achieve a 3D effect. As such, each stereoscopic image is tinted a different color, such as red and blue (or cyan). The images are then interlaced into a single viewable image, which contains columns of pixels that alternate between the left and right camera elements 30A-B. This image that is output by the camera elements 30A-B is then visualized through glasses that contain a red color filter that is placed over the left eye, and a blue color filter that is placed over the right eye. In this way, each eye only views or sees either the red or the blue image. The disparity between the two images, which results from the baseline separation between the camera elements, or interaxial disparity, creates a misalignment between the left and right interlaced images. This disparity forces the eyes to focus, or converge the disparate images, at a point that is either in front of or behind the image plane, which results in a "floating effect" in the video image. The floating effect that is created using this process makes the objects in the image appear to have depth in relation to each other and to the imaging plane, thus creating a 3D effect.

In an alternative embodiment, the 3D display 60 of the communication apparatus 10 may utilize a polarization-based 3D display, whereby the following discussion is presented. Specifically, polarization-based 3D can be implemented by forcing one image, such as the left image, into a vertically polarized state and the right image into a horizontally polarized state. In order to visualize this 3D effect, the viewer must wear glasses, such that one lens, the left in this case, has a vertical polarization, while the right lens has a horizontal polarization. Next, the left and right images are combined into an interlaced form, as previously discussed, with regard to the anaglyphs. When wearing the glasses, the viewer is only able to view, or see, the left image with the left eye and the right image with the right eye, thereby generating a 3D effect. This method, which utilizes interlacing, will cause a reduction in resolution. Polarization-based 3D may also implement different polarization states, such as circular polarization, which is desirable, since the user will not lose part of the image due to misalignment (i.e. tilting of the head). It should also be appreciated the left and right images may be polarized at other angles, such as 45 degree and 135 degree, respectively, instead of being polarized horizontally and vertically. In addition, another polarization method exists, which does not suffer from resolution loss, as in interlacing. This method requires two video displays or video monitors (small monitors if implemented on a handheld device), which are designated as a right monitor and a left monitor, which are positioned at substantially right angles to each other. The light from the left monitor is passed through, for instance, a left circular polarizing filter, and the light from the right monitor is passed through a right circular polarizing filter. The filtered light images are brought together using a beam combiner and the output image is viewed through polarized glasses. This form of polarization 3D suffers from a significant dimming effect, due to the filters and the beam combiner. The use of the polarization-based 3D by the 3D communication device 10 may be utilized by the 3D display 60 that is configured as either a monitor, a 3D projector or any other suitable device.

Still in other embodiments the 3D display 60 of the 3D communication device 10 may use an active shutter 3D display, whereby the following discussion is presented. Specifically, the active shutter display provides that left and right frames are displayed either in an interlaced mode or in an alternating fashion. When viewing the images, the user wears electrically powered eyeglass, which function to alternatingly shutter or switch on and off the left eye and then the right eye. In this way, each eye only views or sees its corresponding image. This occurs at a very fast rate (e.g. 60-240 Hz) so that the shuttering is not noticeable to the human eye. One advantage of this method is that the full resolution of each image can be displayed when in frame sequential mode. Different from interlacing, frame sequential mode works by time multiplexing of the left and right image frames. The frames are very quickly (>60 Hz) displayed, from left to right, or vice versa, in sequential order, while the shutter system blocks the left eye while the right image is displayed, and blocks the right eye while the left image is displayed. It should be appreciated that the active shutter display used the display 60 of the 3D communication device 10 may be provided by a monitor, a 3D projector, or any other suitable display.

In another embodiment, the 3D display 60 of the 3D communication device 10 may utilize a head-mounted 3D display, whereby the following discussion is presented. When using head-mounted displays, each camera image is sent to a corresponding or associated display, whereby a left camera image is delivered to a display placed over the left eye, and the right camera image is delivered to the display placed over the right eye. In this manner, the side-by-side incoming video stream needs only to be split in half and sent to the appropriate screen. For some displays, the side-by-side display will not need to be split, as the onboard processor automatically distributes the image (i.e. sends the left-half of the incoming image to the left eye, and sends the right-half of the image to the right eye). No interlacing or alternation of video frames is necessary when this method is used for 3D display, as each eye is already viewing its corresponding image at a natural disparity, much like looking through binoculars.

Figure 13:
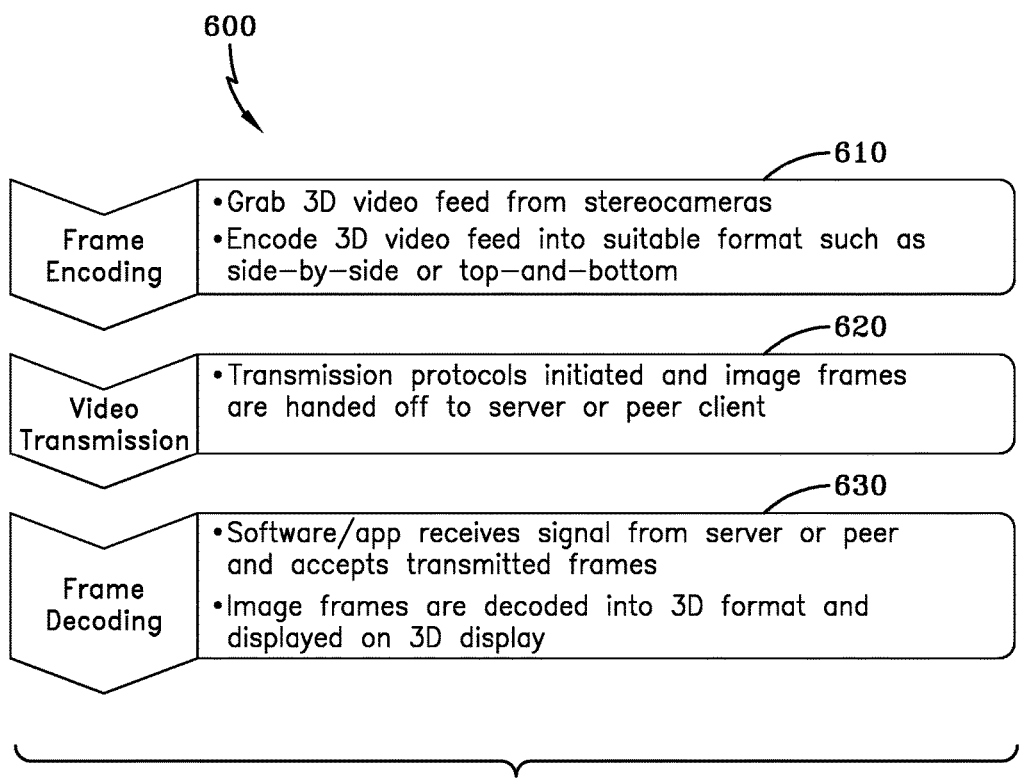
FIG. 13 is a flow diagram showing the operational steps taken for processing 3D video content by the 3D communication device in accordance with the concepts of the present invention.

Continuing, the controller 20 of the 3D communication device 10 is configured with the necessary hardware, software, or combination thereof to carry out a process 600, as shown in FIG. 13, to capture a 3D video stream from the camera elements 30A-B of the 3D camera 40, encode the video into a 3D format, transmit the video to a remote location (in a wired or wireless manner), and decode the 3D video, so as to display the 3D information on the 3D display 60, such as by use of autostereoscopy. Audio data may also be captured, transmitted and synchronized with video data, in a way that is similar to methods utilized in 2D video chatting software. Specifically, a flow diagram showing the operational steps taken by the 3D capture and display process 600 is shown in FIG. 12. Specifically, at step 610, a video-encoding step is performed, whereby the 3D camera 40 of the communication device 10 grabs or captures 3D video or photos, whereupon it is encoded as a 3D video feed that is placed into a suitable format, such as side-by-side or top-and-bottom. Next, at step 620, a video transmission step is performed, whereby transmission protocols are initiated and image frames are handed off to a server or peer client. Finally, at a frame decoding step 630, the process 600 carried out by the controller 20 of the 3D communication device 10 receives a signal from the server or peer client to accept the transmitted frames, whereupon the image frames are decoded into a 3D format and displayed on the 3D display 60.

Figure 14:
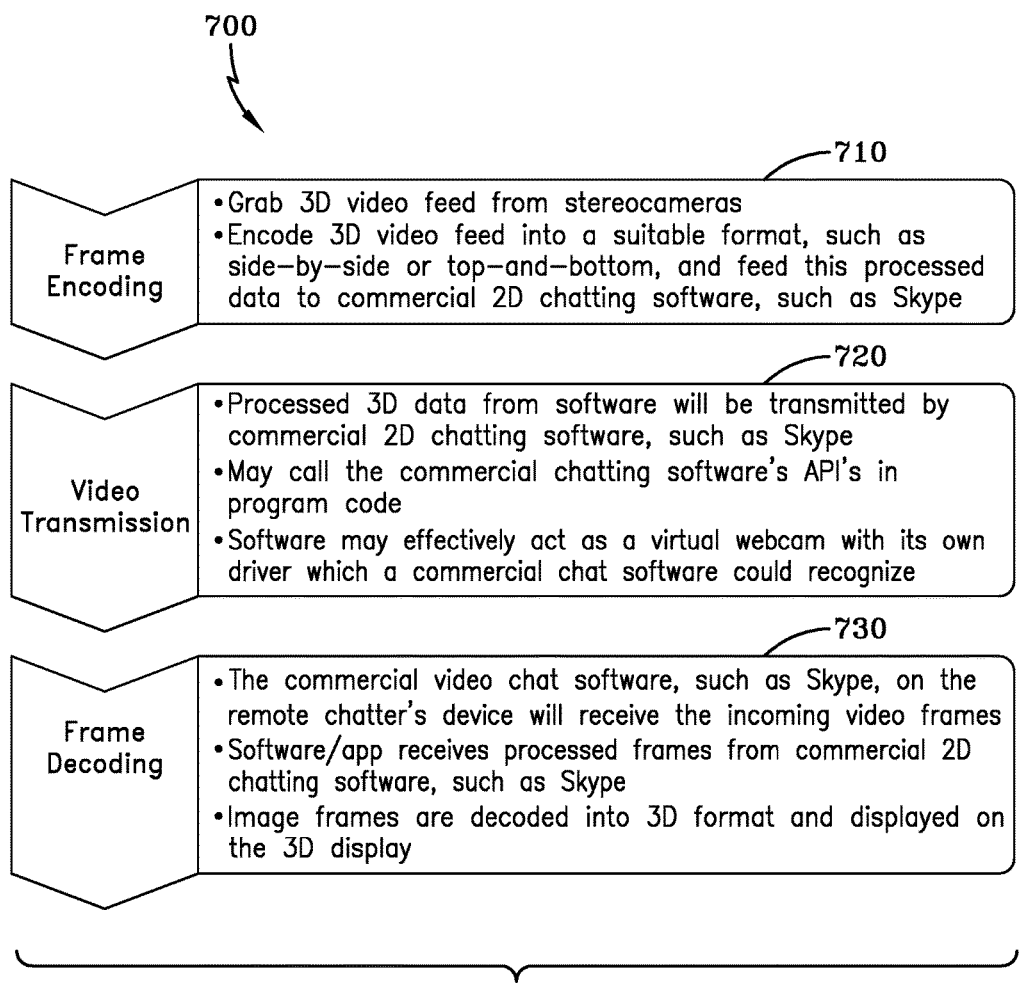
FIG. 14 is a flow diagram showing the operational steps taken for processing 3D video content for use with commercial 2D video communication or chat software, such as Skype™, in accordance with the concepts of the present invention.

In another embodiment, the controller 20 of the 3D communication device 10 is configured with the necessary hardware, software, or combination thereof to carry out a process 700, as shown in FIG. 14, which enables the device 10 to function in conjunction with commercial 2D chatting software, such as Skype™, as shown in FIG. 12. Specifically, the process 700 provides that a 3D video stream is grabbed or captured from the stereoscopic camera 40, whereupon the video is encoded into a processed 3D format, whereupon it is fed to commercial video chatting software, such as Skype™. It should be appreciated that at step 710, the processed 3D video stream will be regarded as a 2D video stream so that it can leverage or utilize the commercial 2D-based platform of Skype™. Next, at step 720, the processed 3D video is transmitted from the commercial chatting software, such as Skype™, whereupon it is decoded at step 730 as 3D video for display on the 3D display 60, such as by autostereoscopy. Audio data is also captured, transmitted and synchronized with the video data in a way that is similar to reported methods used in 2D video chatting software.

The software utilized with the 3D communication device 10 may be in the form of an application operable by the controller 20 that is capable of being executed on any suitable operating system, including but not limited to Android, iOS, Windows and Linux operating systems.

Optionally, the 3D video stream can be compressed after being encoded and can be decompressed before being decoded, if needed. Compression and decompression may be very useful for lowering data usage and dealing with low-speed communication.

Figure 15:
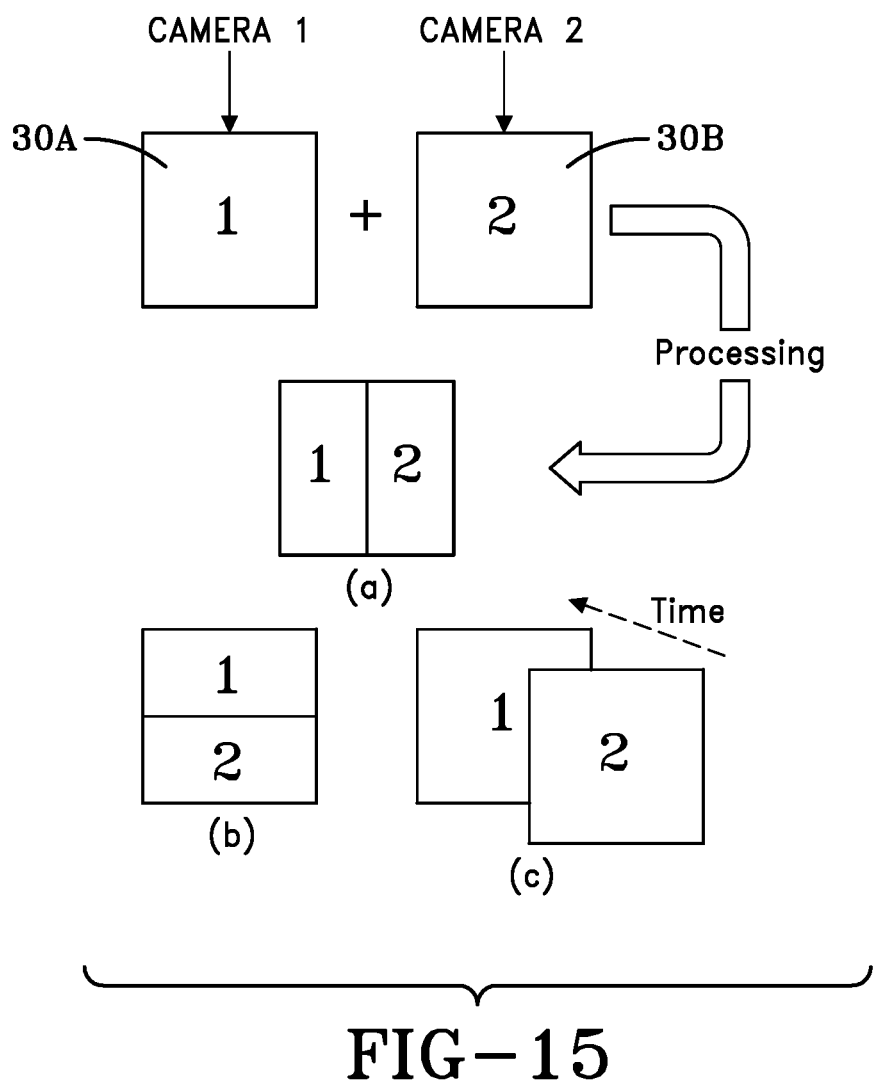
FIG. 15 is a block diagram showing the process by which images captured by the individual camera elements of the stereoscopic 3D camera are received at the same time, such that n-by-m sized images can be combined to create a single side-by-side image (a) of some size N-by-M, or a top-bottom image (b); such that the images can be later separated for processing on the receiving end, such as displaying them in order as a frame sequential image (c) in accordance with the concepts of the present invention.

In still further embodiments, the 3D communication device 10 may be configured so that 3D video frames may be encoded and synchronized in a side-by-side format (or alternatively a top-and-bottom format, a frame-packing synchronization format, a checker-board synchronization format, a line-alternative full-synchronization format, a 2D+depth synchronization format, an over/bottom synchronization format, an alternative synchronization format, an interlaced synchronization format, etc.) by combining serial images that are taken from the stereoscopic camera 40 into a single video frame. This methodology is desirable due to its ease of use with most 3D decoding methods, as well as its ability to provide a smaller file size, which will allow for faster data transfer rates than what is achievable by simultaneously streaming two video feeds, one from each camera. Each frame may be simultaneously detected by one of the stereoscopic camera elements 30A-B. The equally-sized captured images will be passed to the encoding software in Java™, Python™, C++™ or any other suitable software, by means of an operating system (OS) that is independent of a webcam grabbing application, such as OpenCV, or the appropriate OS-based application programming interface (API). Next, the images are joined together into a single side-by-side video frame format (or alternatively a top-and-bottom format, a frame-packing synchronization format, a checker-board synchronization format, a line-alternative full-synchronization format, a 2D+depth synchronization format, over/bottom synchronization format, an alternative synchronization format or an interlaced synchronization format), as shown in FIG. 14a. This frame can then be transmitted over a wired network connection (LAN, Ethernet, etc. . . . ) or wireless network connection (WIFI, 4G, 3G, etc. . . . ) to a remote 3D communication device 10. Furthermore, 3D video communication can be accomplished through various data transmission and handshaking protocols, including, but not limited to: extensible messaging and presence protocol (XMPP), user datagram protocol (UDP), transport control protocol (TCP) or asynchronous transfer mode (ATM). The streaming video frames can be encoded in other formats for the purposes of convenience. Such formats may include top-bottom or frame sequential encoding and synchronization format (or alternatively a frame-packing synchronization method, a checker-board synchronization method, a line-alternative full-synchronization method, a 2D+depth synchronization method, an over/bottom synchronization method, an alternative synchronization method or an interlaced synchronization method), as shown in FIGS. 15b-c. After the side-by-side video frame has been sent from the source and detected on the viewing end, it can be easily converted into a 3D-ready format.

The video stream generated by the 3D communication device 10 can be sent between various apparatuses for display over the Internet, Ethernet, radiofrequency communication (such as high frequency military communication, extremely low frequency communication, etc. . . . ), WIFI, 3G or 4G, or other suitable wired or wireless communication network by means of an existing client-server communication protocol, such as extensible messaging and presence protocol (XMPP), which is based on extensible markup language (XML), or through an existing peer-to-peer protocol, such as Skype™, which uses user datagram protocol (UDP).

Each server-client communication system may have three components: a service, a server and a client. The service is the task or process that is being performed by the server through communication with the client's 3D communication device 10. The server is a machine that performs the task, and the client is the machine that is requesting the service. Data transmission between machines in the server-client system is facilitated using software referred to as a transport provider, such as XMPP for example. This software acts to acquire a transport address to transmit, to establish a connection with the server, to perform handshaking, to perform password protect checking or protocol determination, and to communicate the data and terminate the connection upon completion. In the case of the 3D communication device of the present invention 10, a connection oriented transport protocol may be used since to ensure that the data is being received on either end, in real-time. For World Wide Web communications, the application of the present invention may utilize the latest or current network layer internet protocol (IP) and transport layer protocol, such as Transport Control Protocol (TCP), Hypertext Transfer Protocol (HTP) or XMPP. In the case of XMPP, the jingle extension of the protocol may be utilized. The advantage of such a system is that anyone can create their own XMPP server; there is no need for a central server, however XMPP can utilize one if it is desired.

Figure 16:
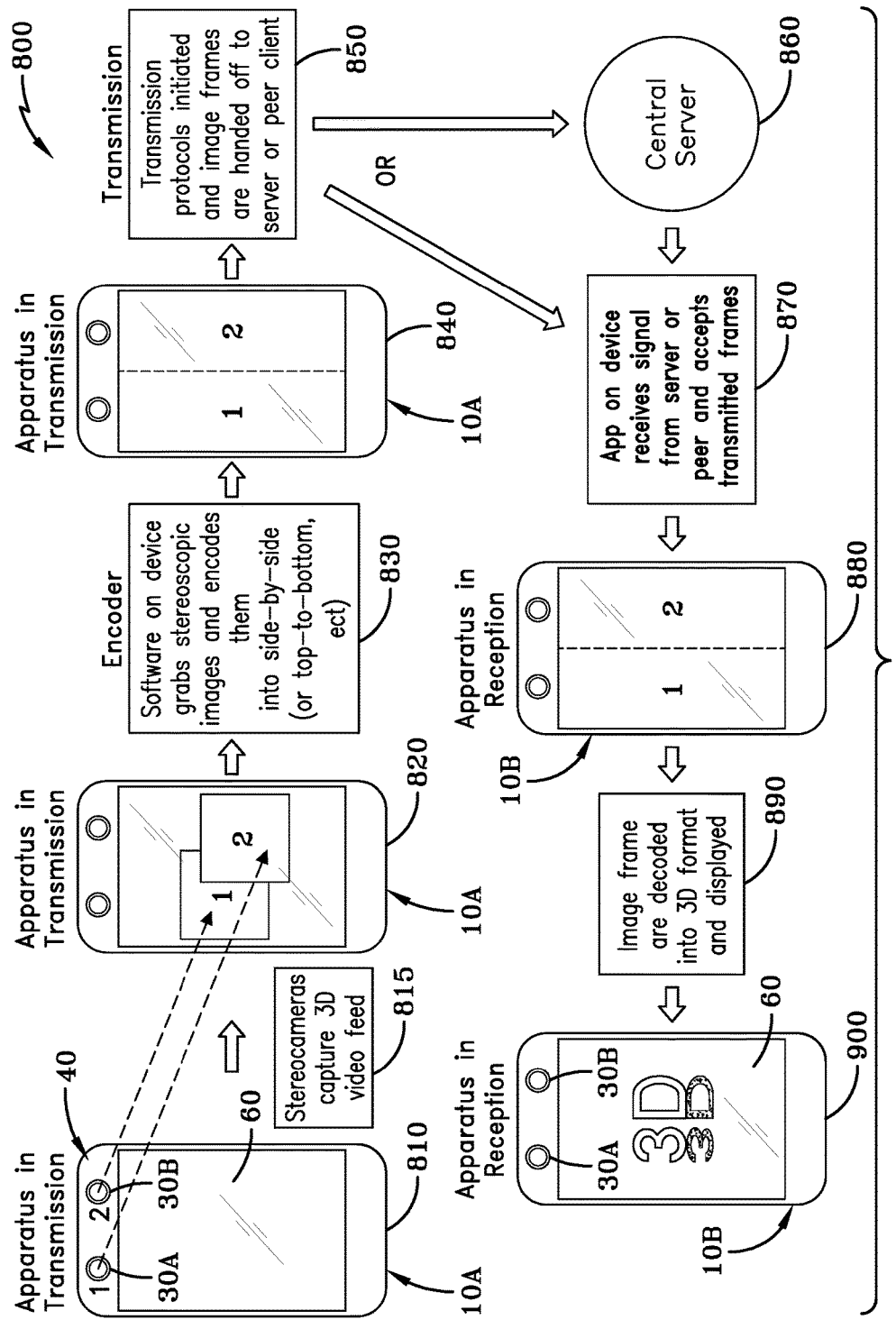
FIG. 16 is a flow diagram showing the operational steps taken by a method carried out by a client-server to transmit 3D video from one 3D communication device to another in accordance with the concepts of the preset invention.

The transmission protocol software, using XMPP as an example, may be packaged into an application, which the client would install onto their 3D communication device 10. The application would allow the user to sign into a user account, using credentials, such as a user name and password for example, through the XMPP software, which would also keep a contact list for the client. When the user is ready to chat, the application calls the stereoscopic 3D camera 40 using a system application programming interface (API). The application software, which is controllable through Java™, C++™, or any other suitable programming language, then operates the stereoscopic 3D camera 40 and processes the image frames in the manner discussed. When ready to communicate with another client, the application calls the XMPP software, which in turn, connects with the server using a transport address, which is either programmed into the software or obtained through a database. The server may send a chat request, on the client's behalf, to another user who, upon request confirmation, would also connect to the server. The server would then connect the two clients, as shown in FIG. 16. All user IDs and IP addresses are stored either in the central server and/or in the client's contact list. The transport software on either client's device would then facilitate both the transmission and reception of a continuous 3D visual and audio data stream both to and from either the other client or the server.

FIG. 16 shows a flow diagram 800 of the client-server method of video transmission from one 3D communication device 10A (i.e. local device) for receipt or reception by another 3D communication device 10B (i.e. remote device), as in the case of a 3D communication or chat. A downloadable application for execution by the controller 20 accesses and activates the camera elements 30A-B of the 3D camera 40 in order to begin capturing video frames, as shown at steps 810, 815 and 820. The video frames are then encoded into a series of single side-by-side format images (or top-and-bottom format, frame-packing synchronization format, checker-board synchronization format, line-alternative full-synchronization format, 2D+depth synchronization format, over/bottom synchronization format, alternative synchronization format, interlaced synchronization format, etc.), at step 830. The application of the local device 10A then contacts the central server through some communication protocol software, such as XMPP. The central server then contacts the communication software of the remote device 10B, through the application, at steps 850, 860 that is installed and executed on the controller 20 of the remote device 10B: Upon acceptance of the transmission, the server passes on the streaming video to the remote device 10B at step 870. At step 870, the application on the remote device 10B then passes on the data stream through the communication software, and subsequently decodes the data into a 3D format, at steps 880 and 890.

The process also simultaneously operates in reverse, so as to facilitate live, real-time 3D video chatting or communication between the remote device 10B and the local device 10A. As previously discussed, the 3D communication device that is designated by reference numeral 10A represents the first handheld 3D chatting apparatus that is transmitting 3D video, while the 3D communication device designated by reference numeral 10B represents the second handheld 3D chatting apparatus that receives and displays the 3D video. Thus, the communication between the local and remote devices 10A and 10B is two-way, and in fact, both devices 10A and 10B are simultaneously sending and receiving 3D video/audio content, such that the designation of "apparatus in transmission" and "apparatus in reception" in FIG. 16 is for explanatory purposes only.

For peer-to-peer communications, the connection between the local device 10A and the remote device 10B is made directly between users, each of which have a host server on their system, which contains all of their contacts' IP addresses and port numbers. The collective database of the subscribers of the application may be stored on each user's device, as a node, or over the collective network of nodes and supernodes maintained by MICROSOFT, or any other network administrator. The connection between clients can be made through a process, such as UDP hole punching, which utilizes the latest or current internet protocols (IPs), rather than through a central server. UDP does not perform any handshaking protocols or error checking, so any password checking and protocol language matching would have to be performed directly between the host clients or by a login server. Like TCP, UDP utilizes port numbers (or transport addresses) to which sockets can be assigned with similar functionality. The advantage of UDP is its simplicity, allowing for unidirectional streaming of large volumes of data. Another method for connecting clients is through asynchronous transfer mode (ATM). ATM utilizes fixed data packet sizes that are sent at regular intervals and at a pre-specified bandwidth. In this way, smaller sized packets are not delayed by larger ones ahead of them. This code can be assembled into a variety of transport layers called ATM adaptation layers (AAL), which allow the data packets to be adjusted for different sizes and traffic types. This data stream can also be made compatible with the IP network layer by running IP over the AAL.

Associating transport protocol software with an application may be accomplished through the use of sockets. Sockets are referenced objects, which provide the server and client with network addresses for accessing the desired server, making a connection from the server to the client or transmitting data. Server side sockets can listen for messages from the client and can give the server a transport address for accessing the desired service. Client side sockets can be used for seeking out and connecting to the server. Sockets can be thought of as an interface between the application software and the network transport layers, allowing the application to contact the server. Java™ or Python™, or any other suitable programming language, may be used to code or program the application software executed by the controller 20 of the 3D communication device 10 to utilize the sockets.

Frame Decoding Example

Once the video frame is received by the remote device 10B, using the same data transmission protocols, it can be passed to the decoder for 3D conversion. As such, the decoder first detects the number of pixel columns along the horizontal axis of the received image for left/right side-by-side encoding, and then splits the received frame down the middle, vertically. Similarly, the 3D video stream encoded and synchronized with other formats (such as top-and-bottom format, frame-packing synching format, alternative synching format, interlaced synching format, etc.) can also be decoded. For a side-by-side format, the portion of the frame that is to the left of the division is designated as the image coming from the left eye camera, and the image that is to the right of the division is designated as the right eye camera. The disparity length between the two transmitting cameras is known for each frame, and the data will be sent along with the video stream. In this way, the two split images are able to be properly aligned for a number of 3D display systems 60, including a parallax barrier, lenticular displays, anaglyphs, polarization methods, displays utilizing active shutter glasses, head mounted displays, etc. When utilizing a parallax barrier or lenticular display (as in our handheld 3D chatting device), the left and right eye images must first be interlaced before being sent to the 3D display 60. This involves creating a new image frame, which contains alternating vertical columns from the left and right eye images, as shown in FIGS. 2A-B. This new image is incorporated into the graphic user interface (GUI) of the present invention and sent to the 3D display screen 60 via the display API. Through the GUI, the user can place the video feed into full screen mode as needed. This example presents the basic framework of decoding a side-by-side encoded video stream. Similarly, the decoding of other 3D formats can also be realized (such as the top-and-bottom format, the frame-packing synchronization format, the checker-board synchronization format, the line-alternative fill-synchronization format, the 2D+depth synchronization format, the over/bottom synchronization format, the alternative-synchronization format, the interlaced synchronization format, etc.).

Example of Auxiliary Software for Interoperability with Commercial 2D Chatting/Communicating Software (e.g. Skype™)

An alternative method provided by the present invention incorporates commercially-available video chat software, such as Skype™. The software executed by the controller 20 of the 3D communication device 10 grabs or captures the stereoscopic 3D video stream from the 3D camera 40, as discussed previously, and converts it into a side-by-side format stream (or a top-and-bottom format, a frame-packing synchronization format, a checker-board synchronization format, a line-alternative full-synchronization format, a 2D+depth synching, an over/bottom synchronization format, an alternative synchronization format, an interlaced synchronization format, etc.). Transmission can be accomplished through commercial video chat software by passing the encoded frames from the encoder process carried out by the processor 20 of the device 10 of the present invention to the chat software executed by the device 10. This can be accomplished by calling the chat software's APIs in the program code of the present invention. Alternatively, the software of the present invention can effectively act as a virtual webcam with its own driver, which a third-party commercial chat software, such as Skype™, could recognize. The 2D video chat software (e.g. Skype™) then grabs or captures the encoded frames from the encoding process carried out by the device 10, just as it would for any real 2D webcam. The 2D chat software of the present invention would then contact the remote chatter, make a connection to that person's device 10 and transmit the encoded frame.

The commercial video chat software, such as Skype™, on the remote chatter's device 10B detects the incoming video frame. As such, the decoder software of the present invention can be notified of the incoming frame, at which time it will be passed thereto from the commercial chat software. This can again be accomplished directly through the integration of the commercial chat software APIs into the software of the present invention. The frame will then be processed by the decoder, as previously discussed, for 3D conversion and display by the 3D display 60. The decoded frame will then be passed to the software's GUI display of the present invention. At the same time, software of the present invention will call the display driver, via its API, to activate 3D functionality for the pixels that correspond to the video frame display. This is necessary only if the 3D display 60 can be switched on and off; for a passive display, such a call may not be needed. If APIs are not available from the commercial chat software, the frames may be grabbed from the handheld 3D apparatus 10. One way that this may be accomplished is by programming a flag in the chat software of the present invention that activates when the chat software sends image frames to the 3D display screen. The software of the present invention would then intercept these images using the display APIs, where they are decoded for 3D conversion, and passed back to the 3D display screen 60 for viewing in our own GUI.

Since the 3D communication encoding described herein only requires the transmission of a single video stream, the application can be integrated with existing communication services such as Skype™ or Google Hangout™ seamlessly, which already utilizes Jingle. The app would require access to the service's API.

Face Focusing

In one embodiment, the process executed by the 3D communication device 10 may communicate with the 3D display 60 and the stereoscopic 3D camera 40 in a loop to automatically detect faces in each image and to focus both camera elements 30A-B on the image plane of a selected face. Face detection can be performed on each video frame from the stereocameras by means of a commonly implemented algorithm, including the Haar-based Viola-Jones similarity algorithm, the KLT algorithm, the Principal Component Analysis-based Eigenface method, Independent Component Analysis and the Gabor filter similarity-based algorithm, as well as by template matching or frequency transform techniques. If multiple faces are detected in a video frame, the user may select the face on which to focus, by touching that face on the 3D display screen 60, in embodiments where the 3D display 60 is touch sensitive to allow user interaction therewith. Moreover, the face-focusing mode may be displayed, and the user may alternatively select the focal object by touching an area of the display screen 60. The stereocamera 40 will then simultaneously focus on the selected object's (i.e. target object) imaging plane.

In one embodiment, the automatic face detection and simultaneous stereocamera 40 focusing technique may be performed as follows. First, the stereocamera 40 is activated, and the image frames are grabbed by the software of the present invention executed on the controller 20 of the 3D communication device 10. A face detection algorithm is applied on each of the stereo images. If one face is found in each image, both camera elements 30A-B of the 3D camera 40 will focus on that face's imaging plane. If multiple faces are detected, the user will be able to select one face on which to focus by touching the face with their finger on the display screen 60. Initially, the camera 40 will focus on the face with the nearest imaging plane. The refocused image will then be passed back to the 3D display 60 and transmitted to the remote chatter 10B when a video chat session is in effect. The focusing algorithm of the present invention will update in real-time so that the user's face will constantly be in focus during a chatting session.

Remote Focusing

The present invention may also provide a feature that allows a local user 10A to manually select and set the focus of the 3D camera 40, as well as the disparity of a remote chatter's apparatus 10B. In this way, the local user will be able to independently optimize both the focus and the 3D effect for incoming 3D images in order to suit the local user's, own viewing environment. This feature requires that two users, the local user 10A and the remote user 10B, on two separate ends of a chat utilize the present invention. If one of the devices 10 has 3D capability, then only the focus, and not disparity, may be adjusted for that user's 2D camera. For disparity adjustments to occur on one end, either the local user 10A or remote chatter 10B must have a 3D camera 40 with camera elements 30A-B that have automatically adjustable distances between them. Also, the application may require each user to give his or her authorization for the user's chat partner to access and manipulate their camera elements 30 A-B. It should also be appreciated that, in addition to focusing, the local user may also be able to change a remote chatter's inter-camera distance between camera elements 30A and 30B, the angle of the camera elements 30A and 30B, and any other properties of the camera elements 30A and 30B at a remote device 10B.

This function may be implemented by having the local user touch a point or region on the 3D display 60 for the received 3D image, on which the 3D camera 40 will focus. The touch-selected point location is then transmitted back to the remote chatter's apparatus 10B, whose stereocamera 40 would focus on the imaging place of that point. The refocused frames would then be encoded and transmitted back to the local user. The local user could also select, in a similar manner, the face on which to focus when in face-detection mode. Disparity could also be remotely adjusted through the graphical user interface (GUI) of the local user's device 10. The new disparity, as set by the local user, would be sent along with the video transmission to the remote chatter's apparatus 10B, which would automatically adjust camera disparity. The adjusted frames would again be encoded and sent back to the local user for viewing.

Screen Share Feature

The 3D communication device 10 of the present invention may also enable a screen share feature, where multiple users can view each other's real-time view of the screen 60 displayed in 3D.

Picture-in-Picture Feature

The software utilized by the 3D communication device 10 may also include a picture-in-picture feature, which includes 3D-in-3D, 2D-in-3D, 3D-in-2D and 2D-in-2D.

It should be appreciated that in some cases only one user may use the 3D communication device 10, while another user may be using other 3D chatting-capable systems, such as a head-mounted 3D display with stereoscopic cameras 30A-B. In that case, compatible software packages can be utilized that take individual systems' characteristics into account, so as to allow compatible communication between the device 10 and other chat systems.

Applications of the 3D Communication Apparatus:

3D Video Chatting

The present invention offers many possibilities, as it can operate as a standalone 3D chatting/communication-ready smartphone/tablet/computer or a modular gadget/case/dock that can be coupled with a 2D smartphone, tablet or computer. The software features of the present invention may also be offered as a self-contained software or be configured as a software package that can leverage or utilize third-party commercial 2D video chat software, such as Skype™.

The 3D communication device 10 can also facilitate either 1-on-1 chatting or group chatting between a plurality of users that each have a device. Chat rooms can also be enabled by the present invention.

Three-dimensional chatting is very useful for both civilian communication and military communication, as well as in many other environments. Either digital or analog signals representing the video may be transmitted between chatters. The video stream generated by the 3D communication device 10 can be sent between various devices for display using any suitable communication means, including, but not limited to the Internet, Ethernet, radiofrequency communication (such as high frequency military communication, extremely low frequency communication, etc), WIFI, 3G or 4G, or other suitable wired or wireless communication network.

Educational Activities

For remote learning or online course instruction, the 3D communication device 10 allows users to obtain instructions or attend classes in a 3D environment. Such an immense environment can greatly impact society and the manner in which educational activities are delivered. In addition, the mobile features of the present invention enable students to attend online classes on-the-go and at convenient locations and times. The 3D nature of the video chat or communication is also able to enhance the live classroom interactions between instructors and students, as well as, between students.

In addition, the 3D presentation of content by the device 10 enables online laboratory demonstrations to be immersive and lifelike. Furthermore, the presentation of information in 3D is able to greatly enhance the learning experience, especially for laboratory demonstrations that cannot be fully represented with conventional 2D data. Laboratory demonstrations, including but not limited to physics, chemistry, engineering, medicine, mechanics, performance arts, history, design, other arts and sciences may also be facilitated by device 10.

Also, the growing number of homeschooled students can benefit from the present invention, in that the device 10 is able to facilitate the interactions of, and enhance communications among, homeschooled students, which interaction and communication is otherwise lacking. The present invention is also able to facilitate group education where one parent can instruct a particular subject to a group of students in 3D, so as to greatly impact the landscape of homeschooling and enhance the learning experience of the students. In terms of experimental or laboratory demonstrations, the present invention is able to bring vivid 3D demonstrations to students who receive homeschooling, which enhances their learning experience in this regard.

Entertainment

The 3D communication device 10 is also able to facilitate the experience of online entertainment, including, but not limited to family-oriented entertainment, sport-oriented entertainment and adult-oriented entertainment. For family-oriented entertainment, 2D is now replaced with 3D video, which enhances user experience. For adult-oriented entertainment, the 3D nature of the video is able to better represent adult-oriented shows, such as live online shows or paid adult-oriented chat sessions and services. For sport-oriented entertainment, the 3D communication device 10 is able to provide a more immersive and lifelike experience to sport settings and entertainment. The 3D communication device 10 may also be used to broadcast sport events in 3D and/or be used to present the sport events to users in 3D.

3D Social Media

The present invention can also facilitate 3D social media, where personal pictures and videos are captured and presented in 3D. A cloud service can be utilized and communicated by the device 10 for storage and management of 3D data. The uploading/sharing of the 3D photo and videos is as easy as current methods for uploading/sharing 2D photos/videos.

The real content (3D video and photos), as well as 3D virtual content, can be displayed on the 3D display 60 of the handheld apparatus 10. The 3D graphic user interface can also be enabled by the present invention. In addition, 3D virtual avatars can also be displayed on the display 60 of the device 10.

Social media, such as 3D Facebook™, Twitter™, Instagram™, Linkedin™ or online dating services/websites (e.g. MATCH.COM), also benefit from the 3D videos/photos display of the device 10 of the present invention. That is, the 3D nature of the videos or photos will facilitate the interactions between the users of social media.

3D Gaming with Augmented Reality

With the capacity of the 3D communication device 10 to take 3D videos of one's self, one can integrate the real-time 3D video stream of the present invention into a virtual 3D gaming environment to enable augmented reality. The gaming experience can be greatly enhanced with the user's 3D video stream being integrated into the virtual 3D gaming environment. For instance, the real-time expressions of a local user 10A can be captured, integrated with the virtual gaming environment and displayed on a local 10A and a remote 10B 3D chatting device 40. In another embodiment, the 3D video of multiple users may be captured by a plurality of communication devices 10, and such videos may be integrated into the virtual environment for augmented reality or gaming purposes.

3D Shopping

The 3D communication device 10 of the present invention can also facilitate online shopping. As such, the 3D information captured by the local user can be used for shopping purposes (e.g. to see whether a shirt would potentially look good on the user). Also, the 3D presentation of merchandise also gives users more information in making purchasing decisions. In one embodiment, the user may control the 3D communication device 10 located at a remote location to visualize the remotely located merchandise in 3D. The aforementioned remote focusing feature may also enable the local user 10A to control the settings of the remote communication device 10B to visualize the merchandise as the local user 10A prefers. The remote communication device 10 may further communicate with another electromechanical device to move/rotate/manipulate the merchandise, as the local user prefers. In another embodiment, the 3D images/videos captured previously may be presented by the communication device 10 to the various users.

Medical Use, Patient-Clinician Interactions and Telemedicine

The 3D communication device 10 of the present invention can also enable 3D patient-clinician interaction and telemedicine. Self-assessment with 3D medical evidence, such as a color picture, can be transmitted from the patient to the clinician. 3D chatting between patients and clinicians can also facilitate telemedicine. In cases where patients suffer from mental illness, 3D chatting is able to deliver a better outcome of telemedical psychotherapy or telemedical counseling. In another embodiment, 3D medical training may be enabled by the communication device 10, where the medical procedures captured by the communication device 10 may be transmitted to a plurality of remote communication devices 10B. For example, the local user 10A may be a surgeon demonstrating surgical techniques to medical students 10B situated elsewhere; consequently, the workflow in medical schools and/or hospitals may be improved. In yet another embodiment, medical students may be able to take classes to observe lab demonstrations remotely with vivid 3D images/videos, which are enabled by the communication device 10. In yet another embodiment, a patient suffering from chronic diseases may use the communication device 10 to capture 3D videos of a wound and transmit the 3D data to remote clinicians who may use another communication device 10 for visualization; the clinician may also control the settings of local communication device 10 to capture the relevant 3D data from the local patient. In yet another embodiment, the patient may use the communication device 10 to capture and upload the relevant 3D data of the lesions for visualization of clinicians to facilitate physician-patient shared decision-making. In yet another embodiment, the 3D chat between the psychiatrist and the patient may be enabled by the communication device 10, where traditional counseling sessions may be delivered telemedically. In yet another embodiment, the communication device 10 may include software to present a digital hopebox in a 3D format. In yet another embodiment, the communication device 10 may enable the video communication of a patient and clinicians in 3D to facilitate on-call duties.

Depth Sensing for Adjusting the Inter-camera Distances and Display Settings

Figure 17:
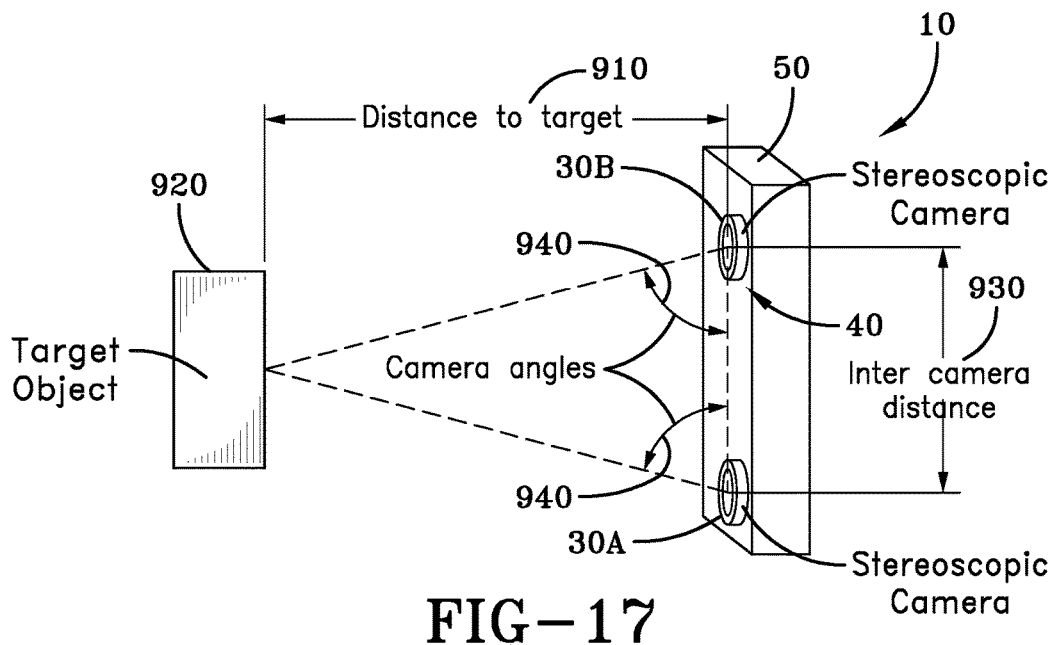
FIG. 17 is a schematic view of the camera elements of a stereoscopic 3D camera, whereby the communication device of the present invention uses trigonometry to determine the angles of the camera elements based on an inter-camera distance and a target distance in accordance with the concepts of the present invention.

In another aspect of the present invention, the device 10 may be configured to perform a depth sensing process, as described with regard to in FIG. 17, which is used to infer or identify a target distance 910 between a chatter or target object 920 and the camera elements 30A-B of 3D camera 40. Based on the identified target distance 910, the device 10 is able to adjust an inter-camera distance 930 that is between the centers of the camera elements 30A-B. In addition, the identified target distance 90 may also be used to adjust the angles of the cameras 30A-D, the foci of lenses, the zoom of lenses, as well as display settings and other operating parameters of the device 10 accordingly, so as to optimize the settings at the target distance 910 changes. As a result of the optimized settings, especially the inter-camera distance 930, the device 10 is able to provide an optimized 3D effect on the 3D display 60 of the device 10 of the local user or the remote user.

Specifically, the ability to identify the target distance 910 from the device 10 to a desired focal plane (i.e. target object 920) is important in determining the optimal user distance from the stereoscopic camera elements 30A-B of the 3D camera 40, or when configuring the optimal distance between the stereoscopic camera 40 when using a configuration, whereby the camera elements 30A-B of the 3D camera are adjustable. Additionally, knowledge of the target distance 910 will allow the device 10 to adjust the angle 940 of the stereoscopic cameras 30A-B to optimally focus at the desired distance and have a desirable binocular overlap. The calculation of the angle 940 may be conducted using the target distance 910, the inter-camera distance 930, the zoom of lenses, as well as trigonometry.

In order to determine the target distance 910 from any pair of stereoscopic cameras, such as camera elements 30A-B, of the device 10 to a target focal plane or object 920 (e.g. the user), any suitable method may be used, including but not limited to stereoscopic disparity calculation (i.e. stereo triangulation), optical time of flight measurements, ultrasonic measurements, sheet of light triangulation, structured light depth sensors (such as Kinect™), coded aperture, etc.

Figure 18:
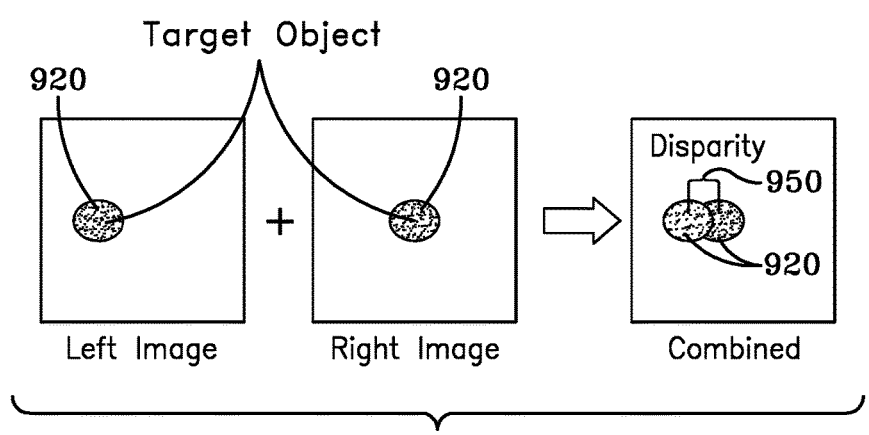
FIG. 18 is a schematic view of the disparity that is observed between the right and left stereoscopic images when looking at the same target object, such that the disparity is clearly evident when the two camera images are combined.

In the case of stereo triangulation, the disparity that is seen between a pair of stereoscopic images is due to parallax, or the shift in the relative position of the target object 920 that is seen by two cameras at two slightly different locations. This effect can be demonstrated by looking at a fixed target object with only the left eye, while closing the right, and then looking at the same target object with only the right eye, while closing the left eye, and noting how the relative location of the object shifts with regards to the background. If two equal-sized imaging scenes, from the right and left camera elements 30A and 30B, are placed over each other, the target object 920 from each scene will not be at the same location, as shown in FIG. 18. The distance (i.e. disparity distance 950) between the combined right and left target object 920 images, as seen by the camera elements 30A-B is referred to as the "disparity". That is, FIG. 2 shows block diagram showing the disparity that is observed between right and left stereoscopic images, captured by respective camera elements 30A-B, when looking at the same target object 920, whereby the disparity becomes evident when the two camera images are combined. This disparity distance 950 can be derived using a look-up table of pre-defined values (e.g. the lookup table can be obtained by proper characterization and calibration); and each disparity is correlated to a specific target distance 910 to the focal plane of the target object 920. A focal plane may be identified by user selection on the touch screen enabled 3D display 60 of the device 10 or by automatic object detection by the apparatus software, such as face recognition. The disparity distance can be determined from a point or set of points on that focal plane. These points can be automatically determined from the center of the focal region that appears on both stereoscopic images, or by user selection on the touch screen interface or any other input components of the device 10. Once the points are determined, the average disparity can be found by comparing the distance between corresponding points on each stereoscopic image. Correlating disparity to a physical distance may be done prior to imaging via a calibration step, where objects of known distances are imaged and the corresponding disparity of each distance is found. Hence, a lookup table can be built with such a calibration step. Alternative means of point selection for disparity distance calculation include, but are not limited to pattern recognition or shape matching for finding like objects that appear in both camera images, or the use of unique fiducial markers such as infrared lights such as LEDs or reflectors.

In the case of optical time of flight measurements for determining the target distance 910, such measurements can be conducted using low intensity coherent light, such as a Class I laser. One such process, also known as LIDAR or "light radar", typically utilizes a pulsed near-infrared light source. The target distance 910 can be determined from the speed of the utilized wavelength of light through the local atmosphere, as well as the difference between the time at which the optical pulse was emitted from the source, and the time that the reflected optical pulse was detected by an on-board optical detector, such as a photodiode. In this way, the measured time of flight of the optical pulse can be utilized to directly calculate the target distance 910.

In addition, ultrasonic time of flight measurements can be used to determine the target distance 910 in a manner similar to LIDAR. Ultrasonic sensing, however, utilizes high frequency sound waves to determine distances. In this case, the speed of the ultrasonic wave at a particular frequency through the local atmosphere is typically known, along with the time at which the ultrasonic pulse was transmitted. The target distance 910 is then calculated from the time taken for the on-board ultrasonic detector to receive the reflected sonic pulse wave, as well as the speed of the sonic wave.

The sheet of light triangulation and structured light depth sensing methods are mature technologies commonly used in the industry or 3D scanners. Either a laser line or structured light is projected, and the depth profile can be obtained, which is similar to a 3D scanner or Microsoft KINECT™. It should be appreciated that laser point scanning, or line scanning, or structured light illumination may be used for target distance 910 detection or depth sensing. It should be further appreciated that a larger target object 920 (such as a human chatter) may have a different depth profile for different parts of the target object 920 (e.g. The nose of a person is ahead of their cheek), and a complete depth profile of the target object 920 may be obtained. Such depth profile may be represented as point clouds or a surface rendered profile. Depending automatic settings and/or user selection, the appropriate depth reading will be used.

One may also use interferometry techniques to identify the target distance 910 by illuminating points with coherent light and measuring the phase shift of the reflected light relative to the light source to determine the depth or target distance 910. Furthermore, coded aperture techniques may be used to obtain the depth profile or target distance 910.

After obtaining the depth profile or target distance 910, the inter-camera distance is adjusted accordingly. The desirable inter-camera distance 930 may be correlated with the depth or target distance 910 of the chatter or target object 920 using a predefined lookup table. One or more of the camera elements 30A-B of the 3D camera 40 may move to change the inter-camera distance 930 to the desired value calculated, as shown in FIGS. 5A-B, using the device and techniques previously discussed. In addition to the inter-camera distance 930, the angles 940 of stereocamera elements 30A-B may be changed as needed, to optimize the binocular disparity. The settings of the 3D display 60 may also be changed according to the depth profile or target distance 910, especially the distance between the chatter's eyes and the device 10. Other settings of the device 10, such as the focus of each camera element 30A-B, as well as camera zoom, camera gain or, as well as operational parameters of the 3D display 60, such as display 60 illumination level, may also be changed according to the target distance as needed.

As previously discussed with regard to FIGS. 5A-B, the 3D camera 40 of the device 10 may be configured to include adjustably positioned camera elements 30A-B, which is on the same side of the housing 50 as the 3D display 60. In one aspect, the camera elements 30A-B may be moved by sliding, or any other suitable movement mechanism. The device 10 may have a standalone depth sensor or use its stereocamera 40 to infer or identify the target distance 910 (i.e. chatter-apparatus distance). One or both of the camera elements 30A-B may be configured to move to change the inter-camera distance 930, according to the identified target distance 910 (i.e. the distance between the chatter/target object and the device 10).

As previously discussed with regard to FIG. 4, the 3D camera 40 of the device 10 may be configured to include more than 2 camera elements. For instance, 4 camera elements 30A-D may be used. They may be positioned in a configuration that is similar to that shown in FIG. 4 in a linear fashion. The device 10 may have a standalone depth sensor or use its stereocamera 40 to infer or identify the target distance 910 (i.e. chatter-apparatus distance). At least two of the camera elements among 30A-D may be selected to capture 3D images with desirable inter-camera distance 930, according to the identified target distance 910 (i.e. the distance between the chatter/target object and the device 10).

Figure 19:
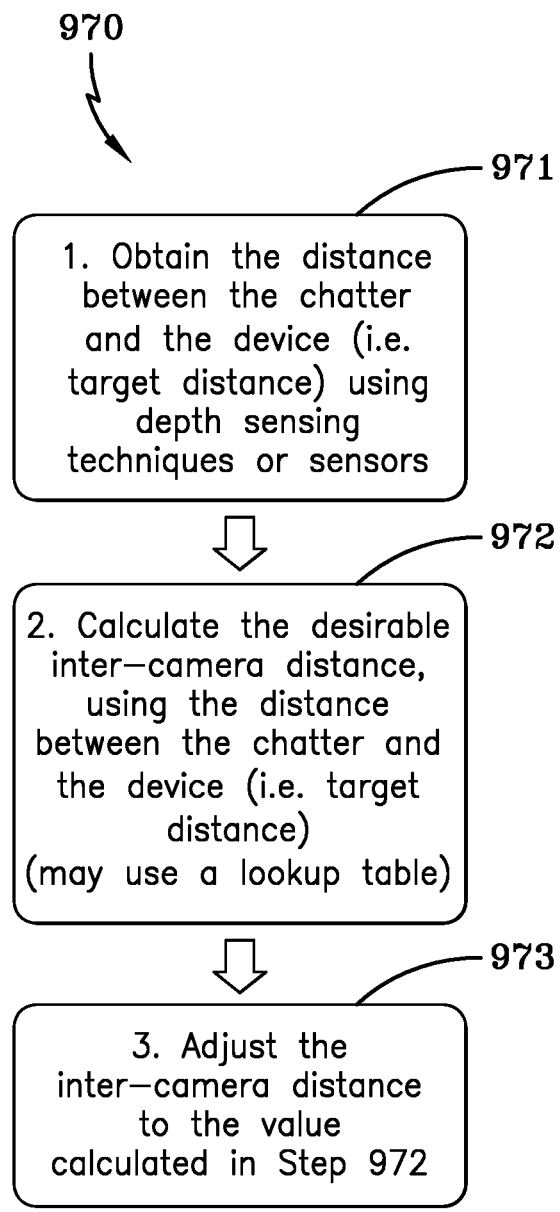
FIG. 19 is a flow diagram showing the process for identifying a target distance, which is used to obtain an inter-camera distance for adjusting the camera elements of the stereoscopic 3D camera of the 3D communication device in accordance with the concepts of the present invention.
Figure 20:
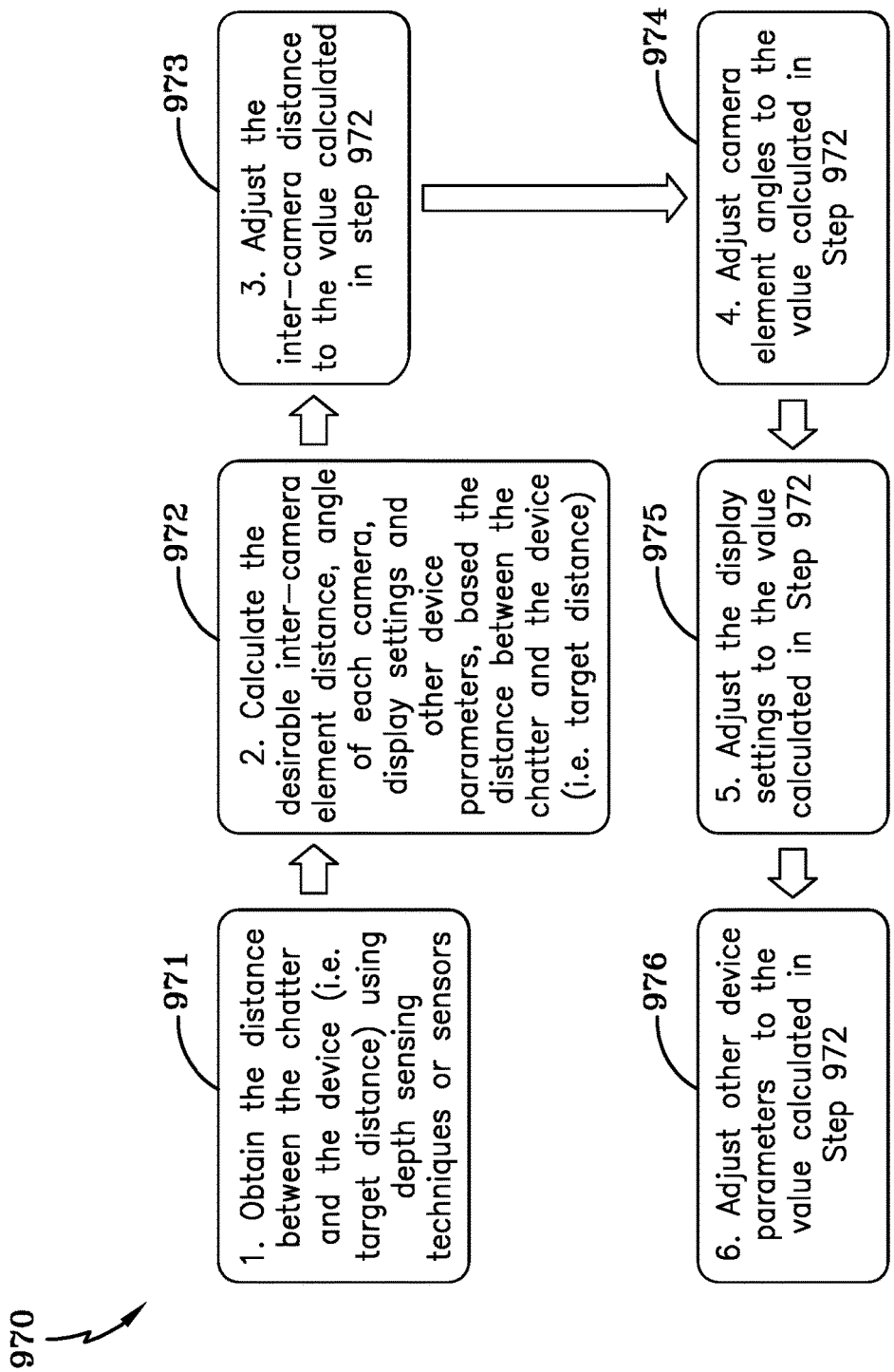
FIG. 20 is a flow diagram showing the process for identifying a target distance, which is used to obtain an inter-camera distance for adjusting the camera elements of the stereoscopic 3D camera of the 3D communication device in accordance with the concepts of the present invention.

A flowchart showing the operational steps 970 taken by the present invention to determine the target distance 910 and to adjust the inter-camera distance 930 are shown in a simplified flow chart of FIG. 19 and a detailed flowchart of FIG. 20. As such, at step 971, the process 970 obtains the distance between the chatter and the device 10 (i.e. target distance 910) using the depth sensing techniques or sensors discussed herein. Next, at step 972, the desirable inter-camera distance 930 is calculated based on the identified target distance 910, whereby a look-up table may be used. Finally, at step 973, one or more of the camera elements 30A-B are moved to adjust the inter-camera distance 930 to the value calculated at step 972. In another embodiment with multiple camera elements, at least two of the camera elements among 30A-D may be selected to capture 3D images with a desirable inter-camera distance 930, according to the identified target distance 910 (i.e. the distance between the chatter/target object and the device 10).

Furthermore, as shown in the process 970 of FIG. 18, step 972 may further include calculating the angle of each camera element 30A-B, display 60 settings and other device 10 operating parameters, which are based on the target distance 910 identified at step 971. In addition, at step 974, the process 970 further includes adjusting the angle of the camera elements 30A-B to the values calculated at step 972. Furthermore, at step 975, the process 970 further includes adjusting the display 60 settings to the value calculated at step 972. Finally, at step 976, the process 970 includes adjusting other device 10 operating parameters to the values calculated at step 972.

"Invisible" 3D Glasses

Figure 21:
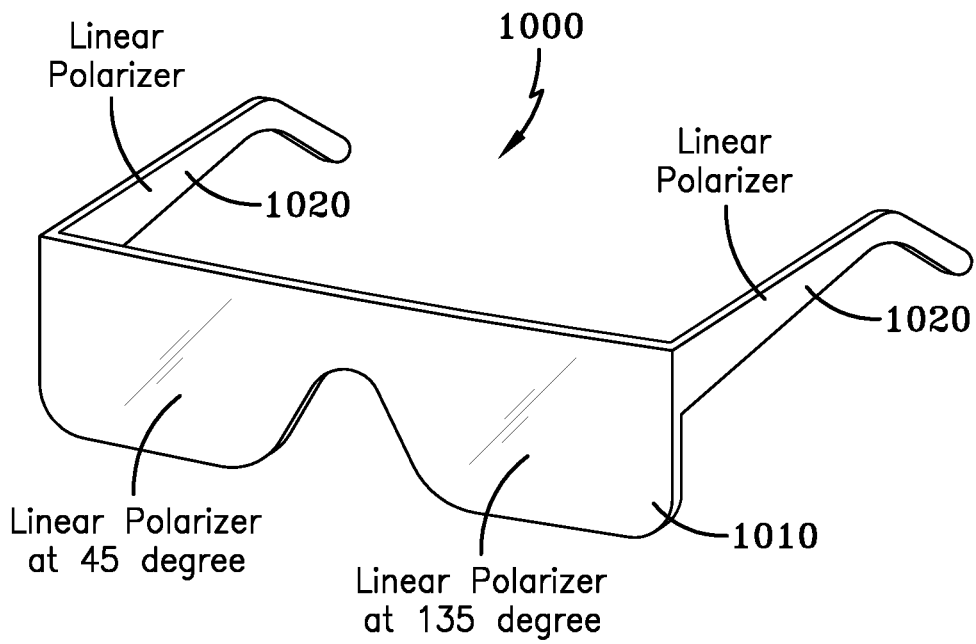
FIG. 21 is a schematic view of "invisible" 3D glasses that include a viewing section formed of a linear polarizer, which is configured for viewing 3D video/photo content on the 3D display of the 3D communication device in accordance with the concepts of the present invention.

In another aspect of the present invention, "Invisible" 3D glasses 1000 may be used in conjunction with the 3D communication device 10 to view 3D video/photo images on the display 60 in 3D, as shown in FIG. 21. Thus, the 3D glasses 1000 allow a local user to view video/photos or conduct a video chat in three-dimensions (3D), however due to the design of the 3D glasses 100, the 3D glasses 1000 will not be visible (i.e. invisible) in the images/video captured, transmitted and displayed either on a local user's device 10A or on a remote user's device 10B. In other words, with the digital processing performed by the process 20 of the device 10, the glasses 1000 worn by a user are removed from the images/videos thereof that are captured by the 3D camera 40 of the device 10. In the case where both chatters are using the "invisible" 3D glasses 1000, both of them will be able to view the 3D content on the display 60, similar to a 3D movie shown in the theater, but will not see the 3D glasses that each other is wearing, thereby improving the quality of 3D video chat, as each user will be able to see an unobscured view of the other's entire face.

Continuing, visualizing a scene in 3D on the display 60 without the assistance of a lenticular display or parallax barrier previously discussed requires 3D glasses. One such method, commonly seen in movie theaters around the world, involves the use of polarized light and polarizer glasses. The stereoscopic images are encoded to use light which has been polarized in particular directions, such as in the case of vertical, horizontal or circular polarized light. For example, one of the stereoscopic images, the left, may be polarized vertically and the other image, the right, may be polarized in the orthogonal direction, horizontally in this case. The images are then added together and displayed on the viewing screen; the scenes from each image will not interfere with each other, since they are polarized in orthogonal directions. Polarized glasses may be used to properly view the screen to obtain the 3D effect. Like the processed stereoscopic images, and in accordance with the presented example, the left lens of the glasses, going over the left eye, may be polarized at 45 degrees, and the right lens of the glasses, going over the right eye, may be horizontally polarized at 135 degrees. The two images may be projected, so as to be superimposed onto the same screen through orthogonal polarizing filters that are set at other angles (e.g. 0 and 90 degrees). In this way, the left eye will only see the images from the left camera and the right eye will only see the images from the right camera, thereby creating a stereoscopic experience.

The issue created when using polarized light with 3D chatting is that the glasses cover part of the user's face, limiting the efficacy of the application. In order to mitigate this effect and improve user experience, the "invisible" 3D glasses 1000 are used, whereby they are digitally detected by the controller/processer 20 when imaged by the stereoscopic camera 30, so that the glasses 1000 are removed from the displayed images with digital processing techniques to form a processed image for display discussed herein.

Figure 22:
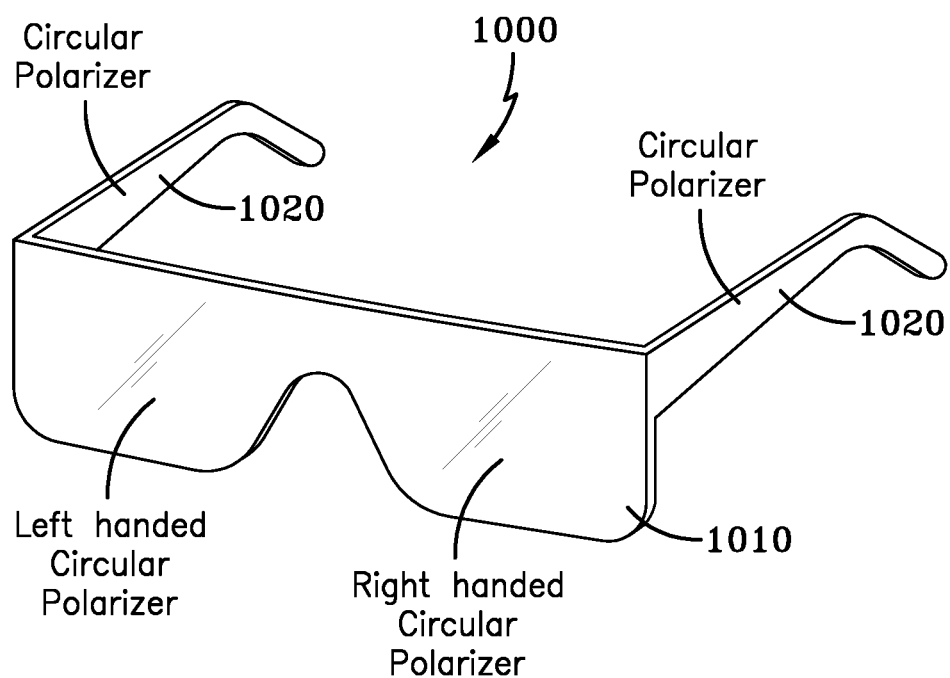
FIG. 22 is a schematic view of another embodiment of the "invisible" 3D glasses that include a viewing section formed of a circular polarizer, which is configured for viewing 3D video/photo content on the 3D display of the 3D communication device in accordance with the concepts of the present invention.

In one example, the 3D glasses 1000 may be made of polarizer material, as shown in FIGS. 21 and 22. In addition, the 3D glasses 1000 may not have any frames. Additionally, the entire pair of glasses 1000 including a viewing section 1010 and temple arms 1020 may be made from the same polarizing material, in a single piece construction. Because the entire glasses 1000 are formed of the same polarizer material, the entire region of a wearer's face that is covered by the 3D glasses will have relative uniform attenuation of light by the same polarizing material. This will allow the entirety of the glasses 1000 to be uniformly removed from the image using a processing algorithm/software that is provide by the present invention.

In addition, the 3D glasses 1000 of the present invention may be constructed as either linear polarized 3D glasses or circular polarized 3D glasses. In other embodiments, the 3D glasses 1000 may be constructed as either passive 3D glasses or active 3D glasses. One example of such glasses 1000 based on linear polarization is shown in FIG. 21. That is the 3D glasses 1000 of FIG. 20 are formed, in their entirety, of polarizing material, and therefore will impose a similar attenuation of light. The glasses 1000 do not have a support frame, and the two temples (earpieces) 1020 on either side of the viewing section 1010 are also made of the same polarizing material as the linear polarizer forming the viewing section. In one aspect, the viewing section 1010, may be found as a single piece of multiple pieces, which may or may not be carried in a frame. Therefore, the glasses 1000 are completely made of one type of polarizing material and will attenuate the unpolarized light relatively uniformly.

In the aforementioned example, the 3D glasses 1000 shown in FIG. 21 have an orthogonal polarizer at 45 degrees and another polarizer at 135 degrees; however, it should be appreciated that any other polarization angles may be used, such as 0 degrees and 90 degrees for example.

The 3D "invisible" glasses 1000 may also be configured in a shape to facilitate their detection by a detection algorithm/software process that is executed by the controller/processor 20 of the device 10. The glasses 1000 may also include fiducial markers thereon, such as reflectors or LEDs, to assist the controller 20 of the device 10 in the detection and segmentation of the glasses 1000.

In another embodiment, the 3D "invisible" glasses 1000 may also have a frame, which may be made of the same polarizing material or materials of similar optical properties, to ensure a uniform attenuation of unpolarized light by different parts of the glasses.

In another example, the glasses 1000 may be made for use with circular polarized display technologies, as shown in FIG. 22.

Figure 23:
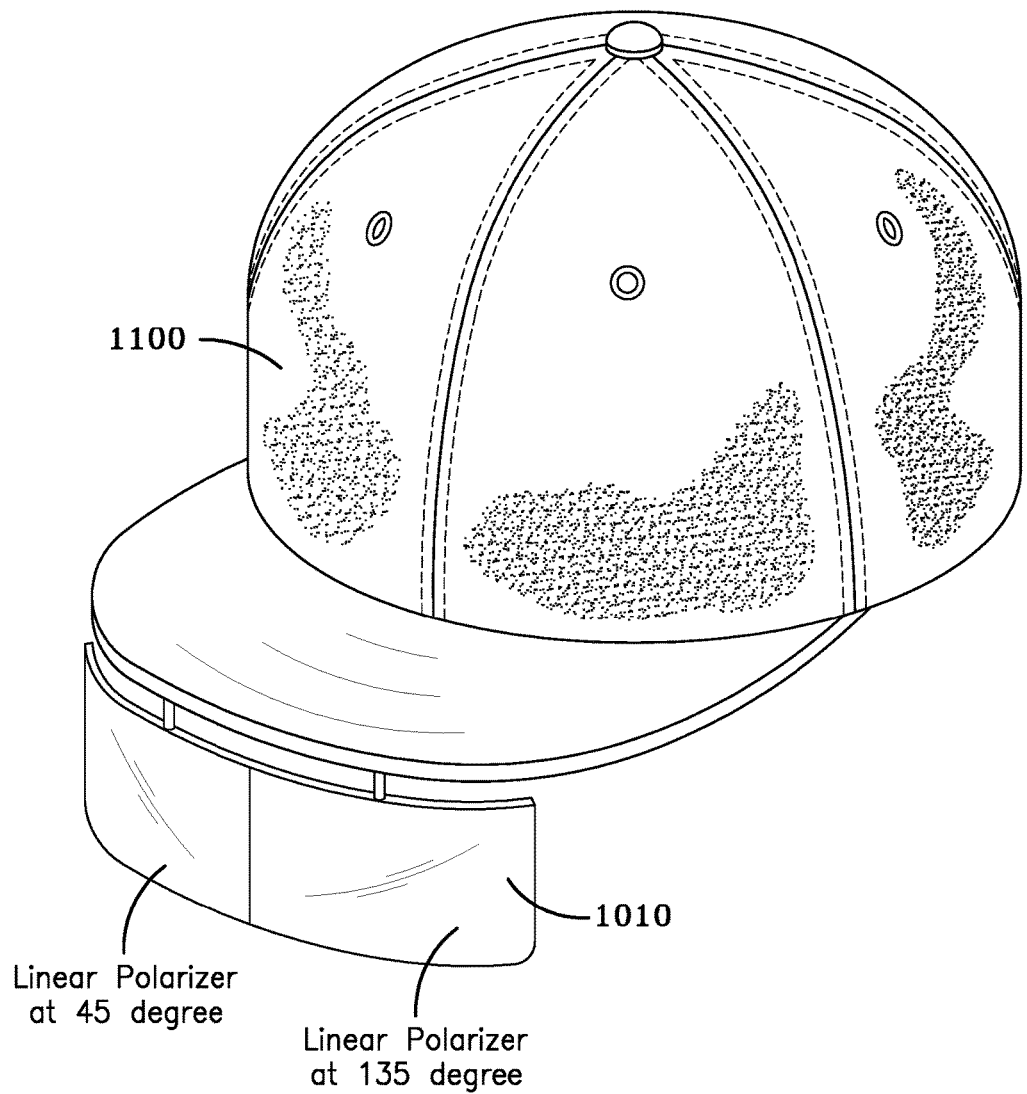
FIG. 23 is a schematic view of 3D glasses utilized in conjunction with a hat in accordance with the concepts of the present invention.

In addition, the glasses viewing section 1010 of the 1000 may be integrated into a hat 1100 using any suitable means, as shown in FIG. 23.

The "invisible" glasses 1000 may also be made to work with an active shutter 3D system, as well. In this case, both eyes have an active shutter glass lens in front of them.
Software/Algorithm to Digitally Remove 3D Glasses from the Image and Video In order to remove the appearance of the 3D glasses 1000 from the images and videos that are captured by the 3D camera 40 during a 3D chat or when 3D videos or photos are taken, the following process 1200 executed on the processor 20 of the device 10 may be used. In particular, the process 1200, as shown in FIG. 24, is carried out by the following steps:

a. Acquisition of reference images without 3D eyeglasses (optional) (step 1210);
  b. Face recognition (optional) (step 1220);
  c. 3D Glasses recognition and segmentation (step 1230);
  d. Intensity compensation (step 1240); and
  e. Edge removal and smoothing (step 1250).

In addition, a simplified process 1200 is shown in FIG. 25, which includes only steps 1230-1250.

The following discussion presents a detailed description of the steps taken by process 1200.

Acquisition of Reference Images without 3D Eyeglasses (Optional) (Step 1210): Before a chatting session, the device 10 may capture images of a user who is not wearing any 3D eyeglasses; these reference images may then be used to facilitate the image processing techniques discussed below.

Face Recognition (Optional) (Step 1220): Face or facial recognition is an optional function to be performed by the device 10, which may be used to identify a user's eyes, facilitating the recognition of the glasses 1000 and shorten computation time. This can be achieved utilizing a number of techniques. For example, detection may be conducted via a simple shape matching algorithm or by means of fiducial markers. Shape matching may be conducted by first utilizing a face recognition algorithm to locate and actively track the user's head position. The face may then be segmented into three sections: top, middle, and lower. The eyes will be found in the middle section, typically the middle half to middle third of the head. A shape recognition algorithm, which compares the middle head region to a library of pre-recorded images of the special 3D "invisible" glasses, can then be implemented by the controller 20 on the middle section to delineate the glasses 1000 from the head.

3D Glasses Recognition (Step 1230): In one embodiment, a pattern recognition technique can be used directly to locate and delineate the glasses 1000, if the glasses 1000 are made in a unique shape that are not likely to be found elsewhere on the user's face. In most cases, the pattern recognition techniques do not necessarily need the optional face recognition previously discussed, and will identify the glasses 1000. The pattern recognition algorithms used may be based on one or more techniques, including but not limited to classification algorithms, clustering algorithms, ensemble learning algorithms, general algorithms for predicting arbitrarily-structured, multilinear subspace learning algorithms, real-valued sequence labeling algorithms, regression algorithms, sequence labeling algorithms, and any combination thereof. In another embodiment, fiducial markers may also be used to help locate and delineate the glasses 1000 from the user's head. Placing four infrared markers such as LEDs or reflectors around the perimeter of the glasses may allow the software to instantly locate and track the general location of glasses. In yet another embodiment, the glasses 1000 may also be recognized based the intensity difference between the glasses region and other region of the face. In yet another embodiment, the glasses 1000 may be recognized by edge detection techniques.

3D Glasses Segmentation (Step 1230): After localization of the glasses 1000, a more specific segmentation process, such as shape matching, spatial frequency filtering, including but not limited to graph cuts, or pattern recognition may be utilized to delineate the glasses 1000. It should be appreciated that any suitable segmentation process may be used, including but not limited to: an automatic, a manual or a semi-automatic segmentation processes. In addition, segmentation may also be based on any suitable method, including but not limited to thresholding methods, clustering methods, compression-based methods, histogram-based methods, edge detection methods, region-growing methods, split-and-merge methods, partial differential equation-based methods, parametric methods, level set methods, fast marching methods, graph portioning methods, watershed transformation methods, model based segmentation methods, multi-scale segmentation methods, trainable segmentation methods, and any combination thereof.

Intensity Compensation (Step 1240): The 3D glasses with polarizers 1000 have the effect of darkening the covered region around and over the eyes of the wear, due to the reduction in transmitted light through the viewing section 1010, similar to sunglasses. The dimming effect can be digitally rectified and compensated by artificially brightening the portions of the images within the delineated margins of the glasses by a process implemented by the controller 20. Determining the amount of brightening required may be accomplished by comparing the light intensity levels in the regions covered by the glasses 1000 with the levels of nearby uncovered regions by the controller 20. An average intensity level may be calculated for each region. The darkened regions within the delineated margins of the glasses 1000 can then be brightened to the surrounding levels. In a similar fashion, the color saturation levels can be adjusted to match the levels found outside of the 3D glasses 1000 margins. Some colors, such as blue eyes, or the whites of the eye, may be estimated based on color temperature, other color saturation levels and look-up table values based on pre-recorded adjustment levels. Alternatively, the user may take one or multiple reference images/videos of himself or herself prior to chatting, in the chat environment, without wearing the 3D glasses (pre-chat calibration). The software executed by the processor 20 of the device 10 can reference these images during chatting, selecting the appropriate image to reference based on head angle, to estimate the appropriate brightness and saturation levels required for appropriate compensation. The intensity compensation and/or other image parameter compensation (color, saturation, white balance, contrast, etc.) may be adjusted on an iterative basis to fine tune the compensation level and optimize the results.

Edge Removal and Smoothing (Step 1250): Any edge artifacts, due to some mismatch between the brightness or color levels on either side of the delineated margins of the 3D glasses 1000, can be corrected by the controller 20 using a color or edge line blending technique such as Gaussian smoothing, blurring, or a color averaging filter. Each of these methods will be used along the delineated margin, as well as on either side of the margin, in a step wise fashion, until a sufficient level of uniformity in spatial frequency or color is achieved. The level of smoothing/correction may be automatic, semi-automatic, manual, user-defined or any combination thereof. The smoothing algorithm be based on any suitable method, including but not limited to additive smoothing, Butterworth filter, digital filter, Kalman filter, kernel smoother, Laplacian smoothing, stretched grid method, low-pass filter, Savitzky-Golay smoothing filter, local regression/"loess", smoothing spline, Ramer-Douglas-Peucker algorithm, moving average smoothing, exponential smoothing, Kolmogorov-Zurbenko filter, and any combination thereof. The aforementioned techniques, as well as other related methods may be used together or independently to achieve optimal results. Edge artifacts may also be minimized by utilizing an iterative method of color and intensity matching between either side of the delineated margin, and adjusting the color and intensity of points further from the margin accordingly. Reference images (i.e. images of the chatter without wearing any 3D glasses) may be utilized to match the color and intensity gradients, found going further from the delineated margins of the glasses 1000, creating a more natural progression. The edge may also be removed via frequency domain filtering in the region of interest (e.g. low pass filter, band pass filter). It should be appreciated that any reported smoothing or edge removal techniques may be used in this step.

In yet another embodiment, the controller 20 may process image/video captured by the user, whereby it is presented on the display 60 so as to be blended with virtual content, to facilitate gaming or entertainment purposes. Thus, the "invisible" 3D glasses 1000 may also be used for augmented reality or gaming purposes, where virtual contents are also presented.

Therefore, one advantage of the present invention is that a device for 3D communication or chat may be configured as a handheld device. Still another advantage of the present invention is that a device for 3D communication may be configured for 3D chatting without the need of 3D-enabled glasses. Another advantage of the present invention is that a device for 3D communication allows a plurality of users who each use the device to communicate via video in three dimensions (3D). Yet another advantage of the present invention is that a device for 3D communication may be configured as an integrated, standalone 3D smartphone/tablet; a modular 3D video chatting add-on device for a 2D smartphone/tablet; a modular case that can be attached to a 2D smartphone or tablet; or a modular 3D video chatting dock that can be coupled with a 2D smartphone/tablet. Another advantage of the present invention is that a device for 3D communication may be configured to utilize software that is self-contained or that is capable of leveraging commercial 2D video communication or chat software, such as Skype™. Still another advantage of the present invention is that a device for 3D communication may be utilized to facilitate online learning by offering a 3D classroom experience, which can greatly enhance homeschooling by providing 3D video chat to facilitate peer-to-peer communication. Another advantage of the present invention is that a device for 3D communication may be utilized to facilitate the experience of online entertainment, such as family-oriented entertainment, sport-oriented entertainment and adult-oriented entertainment. Yet another advantage of the present invention is that a device for 3D communication may be utilized to facilitate 3D social media or online dating services. Still yet another advantage of the present invention is that a device for 3D communication may be utilized to facilitate patient-clinician interactions and telemedicine, especially telemedical psychotherapy or telemedical counseling. Another advantage of the present invention is that a device for 3D communication may be utilized to enable depth sensing between the device and a target object to adjust an inter-camera distance between camera elements of the 3D camera. A further advantage of the present invention is that a device for 3D communication may utilize 3D glasses that are invisible to a viewer of an image on a 3D display that includes the wearer of the 3D glasses.

Thus, it can be seen that the objects of the present invention have been satisfied by the structure and its method for use presented above. While in accordance with the Patent Statutes, only the best mode and preferred embodiments have been presented and described in detail, with it being understood that the present invention is not limited thereto or thereby. Accordingly, for an appreciation of the true scope and breadth of the invention, reference should be made to the following claims.

What is claimed is:

1. A three-dimensional (3D) communication device for communication with one or more other communication devices, comprising:
    a housing having an elongated channel disposed therein, said channel extending along a longitudinal axis;
    a processor;
    a display in communication with said processor;
    a stereoscopic camera in communication with said processor, said stereoscopic camera configured to capture content in three-dimensions (3D), said stereoscopic camera having a first camera element and a second camera element moveably carried in said channel, wherein said first and second camera elements are coaxial with said longitudinal axis; and
    a network communication device coupled to said processor to transmit said captured 3D content to the one or more other communication devices and to receive 3D content that is transmitted from the one or more other communication devices for presentation on said display in three-dimensions;

wherein said processor controls movement of at least one of said first and second camera elements to adjust a distance between said first and second camera elements, such that said distance is based on a position of said stereoscopic camera relative to the content.

2. The 3D communication device of claim 1, further comprising:
a microphone and a speaker each coupled to said processor.

3. The 3D communication device of claim 1, wherein said camera elements are slideably carried in said channel.

4. The 3D communication device of claim 3, wherein said camera elements are carried along a linear path.

5. The 3D communication device of claim 1, wherein said display is a lenticular display.

6. The 3D communication device of claim 1, wherein said display comprises a parallax barrier.

7. The 3D communication device of claim 1, wherein said display comprises a three-dimensional display selected from the group consisting of: glasses-free 3D display, autostereoscopy display, 3D display with parallax barriers, 3D display with lenticular lens, polarized 3D systems, polarization glasses-based systems with linear polarized light, polarization glasses-based systems with circular polarized light, active shutter 3D systems, liquid crystal shutter glasses based 3D systems, volumetric displays, holographic displays, integral imaging 3D system, compressive light field displays.

8. A three-dimensional (3D) communication device for use with a computing device having a communication interface, a network communication device, and a processor, the 3D communication device comprising:
a housing having an elongated channel disposed therein, said channel extending along a longitudinal axis;
a display in communication with said processor;
a stereoscopic camera, said stereoscopic camera configured to capture content in three-dimensions (3D), said stereoscopic camera having a first camera element and a second camera element that are moveably carried in said channel, wherein said first and second camera elements are coaxial with said longitudinal axis; and
a communication interface adapted to communicate with the communication interface of the computing device;
wherein said display and said stereoscopic camera communicate with the processor of the computing device, such that the network communication device of the computing device is enabled to transmit said captured 3D content and to receive 3D content for presentation on said display in three-dimensions, and
wherein said processor controls movement of at least one of said first and second camera elements to adjust a distance between said first and second camera elements, such that said distance is based on a position of said stereoscopic camera relative to the content.

9. The 3D communication device of claim 8, further comprising:
a microphone and a speaker enabled to communicate with the processor of the computing device.

10. The 3D communication device of claim 8, wherein said camera elements are slideably carried in said channel.

11. The 3D communication device of claim 10, wherein said camera elements are carried along a linear path.

12. The 3D communication device of claim 8, wherein said display is a lenticular display.

13. The 3D communication device of claim 8, wherein said display comprises a parallax barrier.

14. The 3D communication device of claim 8, wherein said display comprises a three-dimensional display selected from the group consisting of: glasses-free 3D display, autostereoscopy display, 3D display with parallax barriers, 3D display with lenticular lens, polarized 3D systems, polarization glasses-based systems with linear polarized light, polarization glasses-based systems with circular polarized light, active shutter 3D systems, liquid crystal shutter glasses based 3D systems, volumetric displays, holographic displays, integral imaging 3D system, compressive light field displays.

15. A method of adjusting a distance between a pair of stereoscopic camera elements comprising the steps of:
providing a stereoscopic camera having a first camera element and a second camera element that are disposed in a channel provided by a housing, said channel extending along a longitudinal axis, with said first and second camera elements being coaxial with said longitudinal axis;
determining a target distance between a plane defined by said first and second camera elements and a target object;
moving at least one of said first and second camera elements along said longitudinal axis to change a separation distance between said first and second camera elements based on said target distance.

16. The method of claim 15, wherein said determining step is performed by stereoscopic disparity, optical time of flight, ultrasonic measurement, sheet of light triangulation, structured light depth sensors, or coded aperture.

17. The 3D communication device of claim 1, wherein said processor generates a disparity map based on an image of the content acquired by said first camera element and an image of the content acquired by said second camera element, and
wherein said separation distance is based on said disparity map.

18. The 3D communication device of claim 8, wherein said processor generates a disparity map based on an image of the content acquired by said first camera element and an image of the content acquired by said second camera element, and
wherein said distance is based on said disparity map.

19. The 3D communication device of claim 1, wherein said first and second camera elements each have a line of sight, and said processor is configured to control said first and second camera elements so as to adjust an angle of each said line of sight relative to the content.

20. The method of claim 15, wherein said camera elements each have a line of sight, the method further comprising:
controlling at least one of said first and second camera elements to change an angle of each said line of sight relative to the target object.

* * * * *